US008873564B2

(12) United States Patent
Perras et al.

(10) Patent No.: US 8,873,564 B2
(45) Date of Patent: Oct. 28, 2014

(54) INTER-UNIT TRANSFER SUPPORT USING MOBILE INTERNET PROTOCOL

(75) Inventors: Michelle Perras, Montréal (CA); Xavier De Foy, Kirkland (CA); Kamel M. Shaheen, King of Prussia, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 370 days.

(21) Appl. No.: 13/087,531

(22) Filed: Apr. 15, 2011

(65) Prior Publication Data
US 2012/0093062 A1 Apr. 19, 2012

Related U.S. Application Data

(60) Provisional application No. 61/325,163, filed on Apr. 16, 2010, provisional application No. 61/329,456, filed on Apr. 29, 2010.

(51) Int. Cl.
*H04L 12/56* (2006.01)
*H04W 80/04* (2009.01)
*H04W 8/08* (2009.01)
*H04L 29/06* (2006.01)

(52) U.S. Cl.
CPC ............ *H04W 80/04* (2013.01); *H04L 65/1096* (2013.01); *H04L 65/1089* (2013.01); *H04W 8/08* (2013.01)
USPC ....................................... 370/395.31; 370/392

(58) Field of Classification Search
CPC ..... H04L 45/74; H04L 45/00; H04L 65/1089; H04W 80/04; H04W 8/08
USPC ......... 370/315, 326, 335–336, 342–343, 345, 370/389, 392, 437, 465, 479–480, 498, 230, 370/230.1, 231, 235, 352–356, 397, 399, 370/395.2, 395.3, 395.31
See application file for complete search history.

(56) References Cited

U.S. PATENT DOCUMENTS 7,079,499 B1 * 7/2006 Akhtar et al. ................. 370/310
7,746,876 B2 * 6/2010 Rune et al. .................... 370/401
(Continued)

FOREIGN PATENT DOCUMENTS

JP 2005-537765 A 12/2005
JP 2009-526483 A 7/2009
(Continued)

OTHER PUBLICATIONS

3rd Generation Partnership Project(3GPP), TR 23.831 V0.2.0, "Technical Specification Group Services and System Aspects, IP Multimedia Subsystem (IMS) Service Continuity, Inter-UE Transfer Enhancements, Stage 2 (Release 10)", Feb. 2010, 1-42.

(Continued)

*Primary Examiner* — Kevin Mew
(74) *Attorney, Agent, or Firm* — Condo Roccia Koptiw LLP

(57) ABSTRACT

A WTRU may receive a first data flow from a source device such as a correspondence node and perform a seamless IUT such that the correspondent node is unaware that the flow has been transferred to a different WTRU. The WTRU may register with a first home agent, wherein the first home agent receives a plurality of messages addressed for a home address. The home agent may forward the messages to the WTRU at a first care-of-address. The WTRU may send a binding update to the first home agent. The binding update may comprise a second traffic selector and a second action. The second action may specify that a second message of the plurality of messages is to be forwarded to a different WTRU when the second message matches the second traffic selector.

19 Claims, 18 Drawing Sheets

(56) References Cited

U.S. PATENT DOCUMENTS

| | | | |
|---|---|---|---|
| 8,107,448 B2* | 1/2012 | Hirano et al. | 370/338 |
| 8,170,010 B2* | 5/2012 | Bachmann et al. | 370/389 |
| 8,289,957 B2* | 10/2012 | Chen et al. | 370/389 |
| 2004/0092260 A1 | 5/2004 | Thubert et al. | |
| 2006/0159088 A1* | 7/2006 | Aghvami et al. | 370/389 |
| 2007/0230453 A1* | 10/2007 | Giaretta et al. | 370/389 |
| 2008/0107123 A1* | 5/2008 | Rune et al. | 370/401 |
| 2008/0195730 A1 | 8/2008 | Hasegawa et al. | |
| 2009/0022126 A1* | 1/2009 | Damle et al. | 370/338 |
| 2010/0165946 A1 | 7/2010 | Fujino | |
| 2010/0216462 A1* | 8/2010 | Aso et al. | 455/434 |

FOREIGN PATENT DOCUMENTS

| | | |
|---|---|---|
| WO | WO 2004/023249 A2 | 3/2004 |
| WO | WO 2006/095406 A1 | 9/2006 |
| WO | WO 2007/091421 A1 | 8/2007 |
| WO | WO 2007/095077 A2 | 8/2007 |
| WO | WO 2008/023850 A1 | 2/2008 |

OTHER PUBLICATIONS

3rd Generation Partnership Project(3GPP), TR 23.838 V9.0.0, "Technical Specification Group Services and System Aspects, IP Multimedia Subsystem (IMS) Service Continuity, Enhancements, Service, Policy and Interaction, Stage 2 (Release 9)", Jun. 2009, 1-51.

3rd Generation Partnership Project (3GPP), TD S2-103543, "MIP based Inter-UE-Transfer Mechanism", InterDigital Communications, 3GPP TSG SA WG2 Meeting #80, Brunstad, Norway, Aug. 30-Sep. 3, 2010, 1-5.

Soliman et al., "Flow Bindings in Mobile IPv6 and NEMO Basic Support", draft-ietf-mext-flow-binding-06.txt, IETF MEXT Working Group, Mar. 1, 2010, 1-39.

Johnson, D. et al., "Mobility Support in IPv6", Network Working Group, Jun. 2004, 165 pages.

$3^{rd}$ Generation Partnership Project (3GPP), TS 23.261 V0.2.1, "Technical Specification Group Services and System Aspects; IP Flow Mobility and Seamless WLAN Offload; Stage 2 (Release 10)", Jan. 2010, 18 pages.

Soliman, H., "Mobile IPv6 Support for Dual Stack Hosts and Routers", Network Working Group, Jun. 2009, 41 pages.

Wakikawa, R. et al., "Multiple Care-of Addresses Registration", Network Working Group, Oct. 2009, 37 pages.

$3^{rd}$ Generation Partnership Project (3GPP), TS 24.237 V9.1.0, "Technical Specification Group Specification Group Core Network and Terminals; IP Multimedia Subsystem (IMS) Service Continuity; Stage 3 (Release 9)", Dec. 2009, 176 pages.

* cited by examiner

INTER-UNIT TRANSFER SUPPORT USING MOBILE INTERNET PROTOCOL

CROSS REFERENCE TO RELATED APPLICATIONS

This application claims the benefit of U.S. Provisional Patent Application No. 61/325,163 filed Apr. 16, 2010 and U.S. Provisional Application No. 61/329,456 filed Apr. 29, 2010, the contents of which are hereby incorporated by reference herein.

TECHNICAL FIELD

This application is related to mobile communications.

BACKGROUND

The Internet protocol (IP) multimedia subsystem (IMS) is an architectural framework for delivering IP-based multimedia services. A wireless transmit/receive unit (WTRU) may connect to an IMS through various access networks, including but not limited to networks based on technology such as universal mobile telecommunications system (UMTS) terrestrial radio access network (UTRAN), long term evolution (LTE), worldwide interoperability for microwave access (WiMax), or wireless local area network (WLAN) technology. The WTRU may access the IMS through a packet-switched (PS) domain. Through the use of IMS centralized services (ICS), the WTRU may additionally access IMS services via a circuit-switched (CS) domain.

In a third generation partnership project (3GPP) system that supports IMS, an inter-unit transfer (IUT) (i.e., media mobility) is performed by a WTRU that supports an IMS-session initiation protocol (SIP). An IUT allows a communication session to be transferred from one WTRU to another. There is no standardized solution for non-IMS terminals, (e.g., packet switched streaming (PSS) services capable terminals, real time streaming protocol (RTSP)/real time control protocol (RTCP) terminals, and/or hyper text transfer protocol (HTTP) streaming terminals). Not all systems support IMS, and not all terminals are capable of supporting SIP, and therefore IUT operation for non-IMS terminals and in non-IMS systems may not be supported in a variety of instances.

SUMMARY

A WTRU may receive a first data flow from a source device such as a correspondence node and perform a seamless IUT such that the correspondent node is unaware that the flow has been transferred to a different WTRU. The WTRU may register with a first home agent. The first home agent may receive a plurality of messages addressed for a home address. The home agent may forward the messages to the WTRU at a first care-of-address. The WTRU may send a first binding update to the first home agent. The first binding update may include a first traffic selector and a first action. The first action may specify that a first message of the plurality of messages is to be forwarded to the first device if the first message matches the first traffic selector. The WTRU may send a second binding update to the first home agent. The second binding update may comprise a second traffic selector and a second action. The second action may specify that a second message of the plurality of messages is to be forwarded to a different WTRU when the second message matches the second traffic selector.

The WTRU may include a transmitter for sending a first message to a home agent. The first message may include a first traffic selector and a first action. The first action may indicate that a packet is to be forwarded from the home agent to the WTRU if the packet matches the first traffic selector. The packet may be addressed for a first proxy address, such as a home address in the MIP protocol, and is sent from a source device to the home agent. The WTRU may send a second message to the home agent. The second message may delete the first action and contain a second action. The second action may indicate that a packet is to be forwarded to a different WTRU if the packet matches the first traffic selector. The source device may be unaware the packet is to be forwarded to the second WTRU.

A home agent may receive registration information for a first device from the first device. The first home agent may receive a plurality of messages from a message source. Each of the plurality of messages may be addressed for a home address. The home agent may receive a first binding update from the first device. The first binding update may include a first traffic selector and a first action. The first action may specify that a first message of the plurality of messages is to be forwarded to the first device if the first message matches the first traffic selector. The home agent may receive a second binding update from the first device. The second binding update may include a second traffic selector and a second action. The second action may specify that a second message of the plurality of messages is to be forwarded to a second device if the second message matches the second traffic selector.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1A:
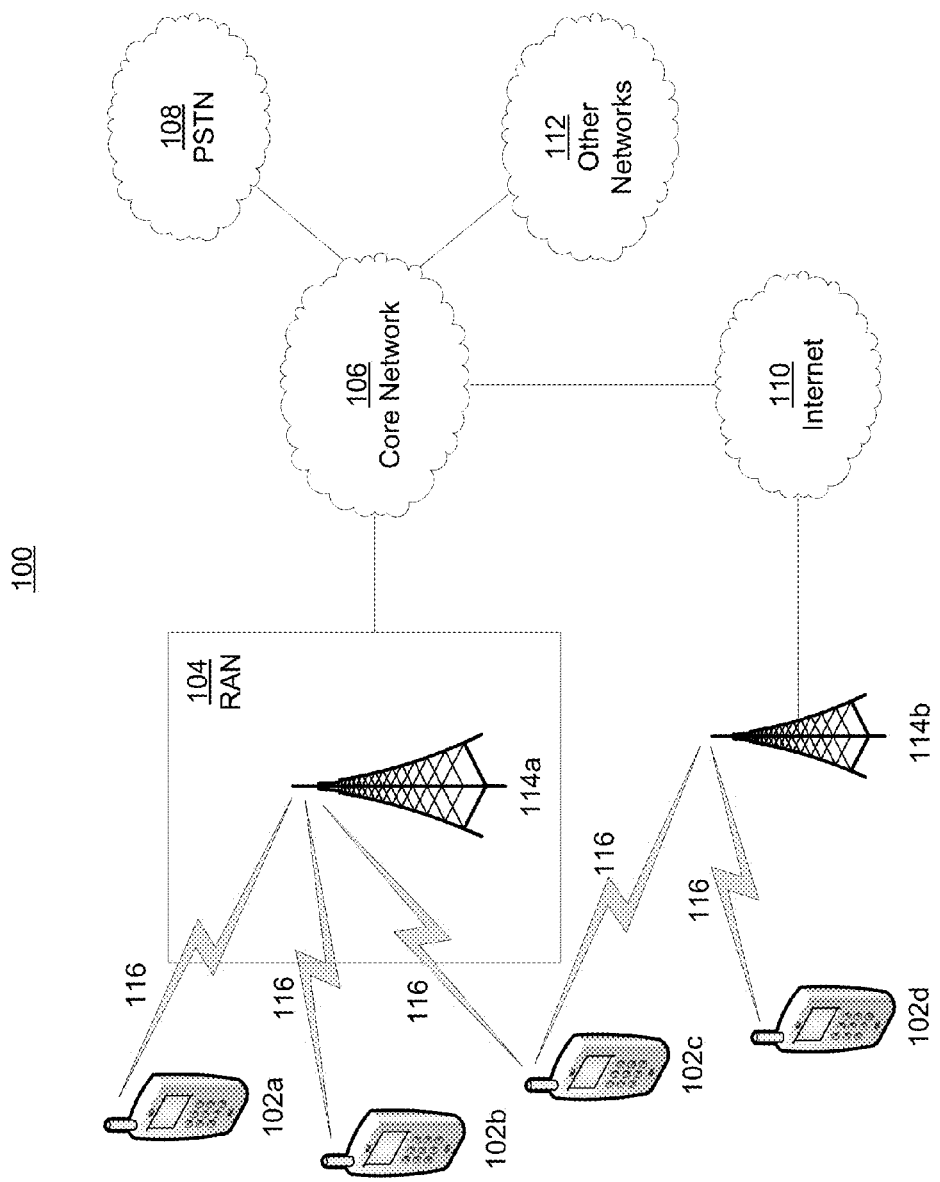
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
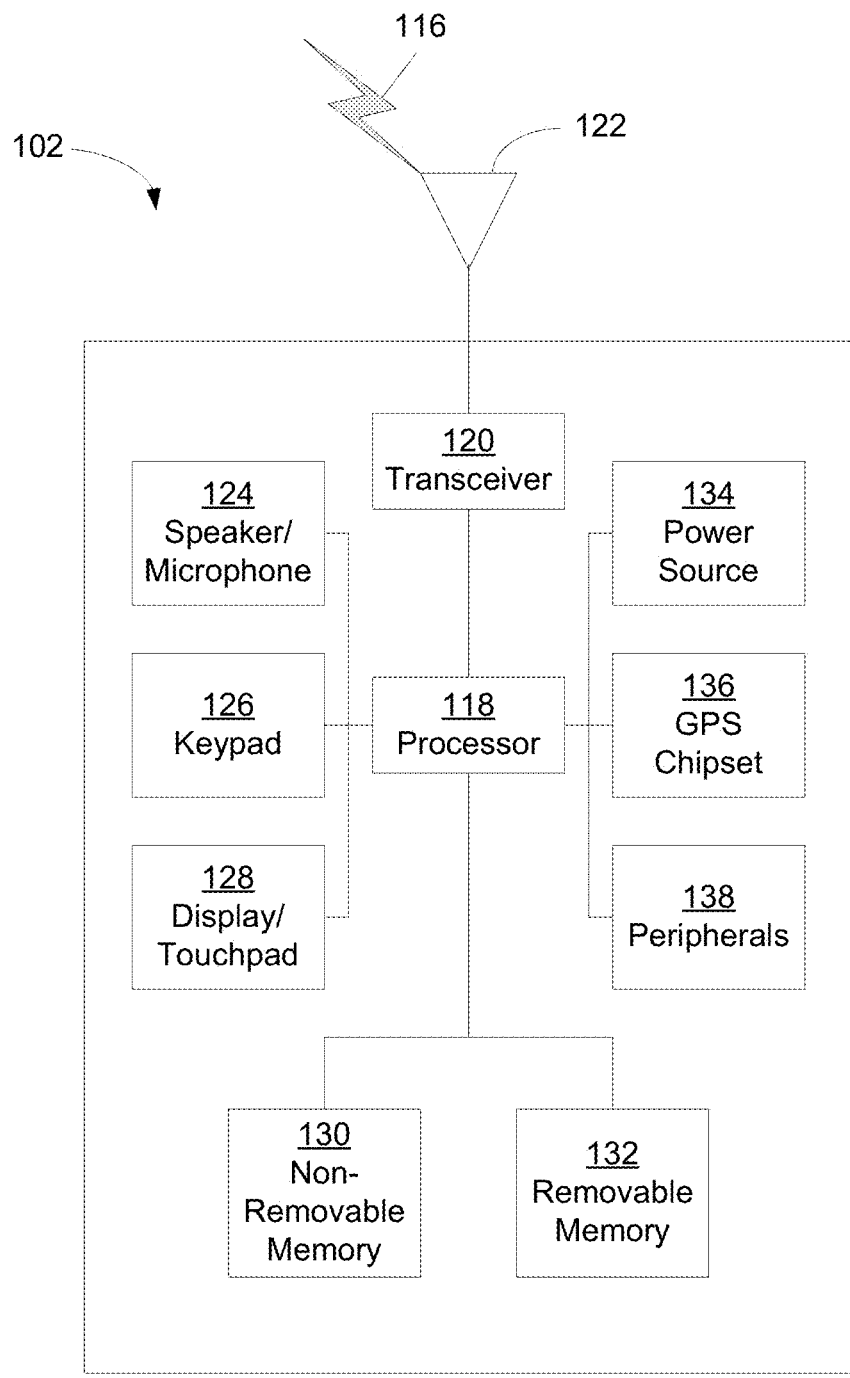
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
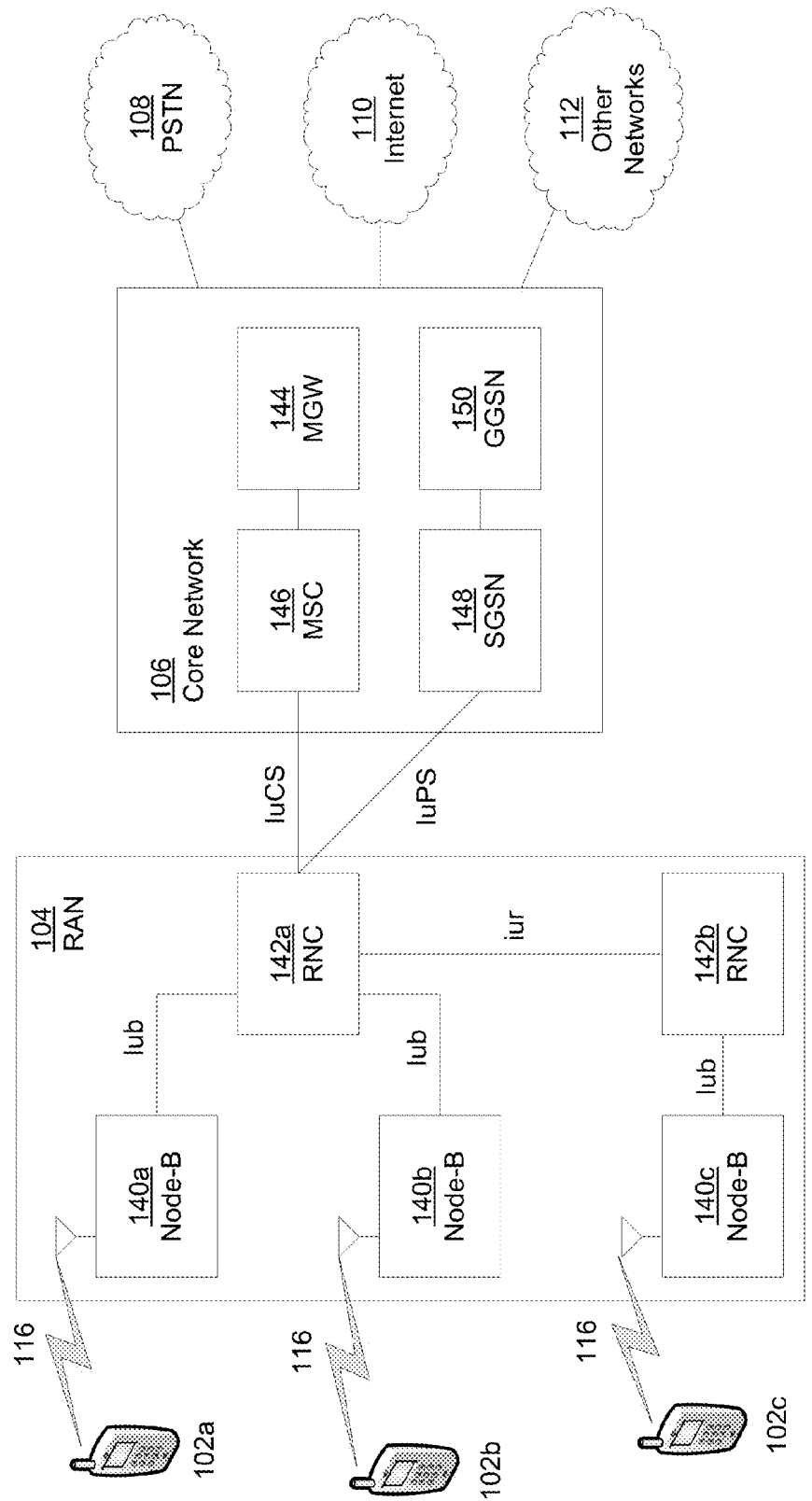
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
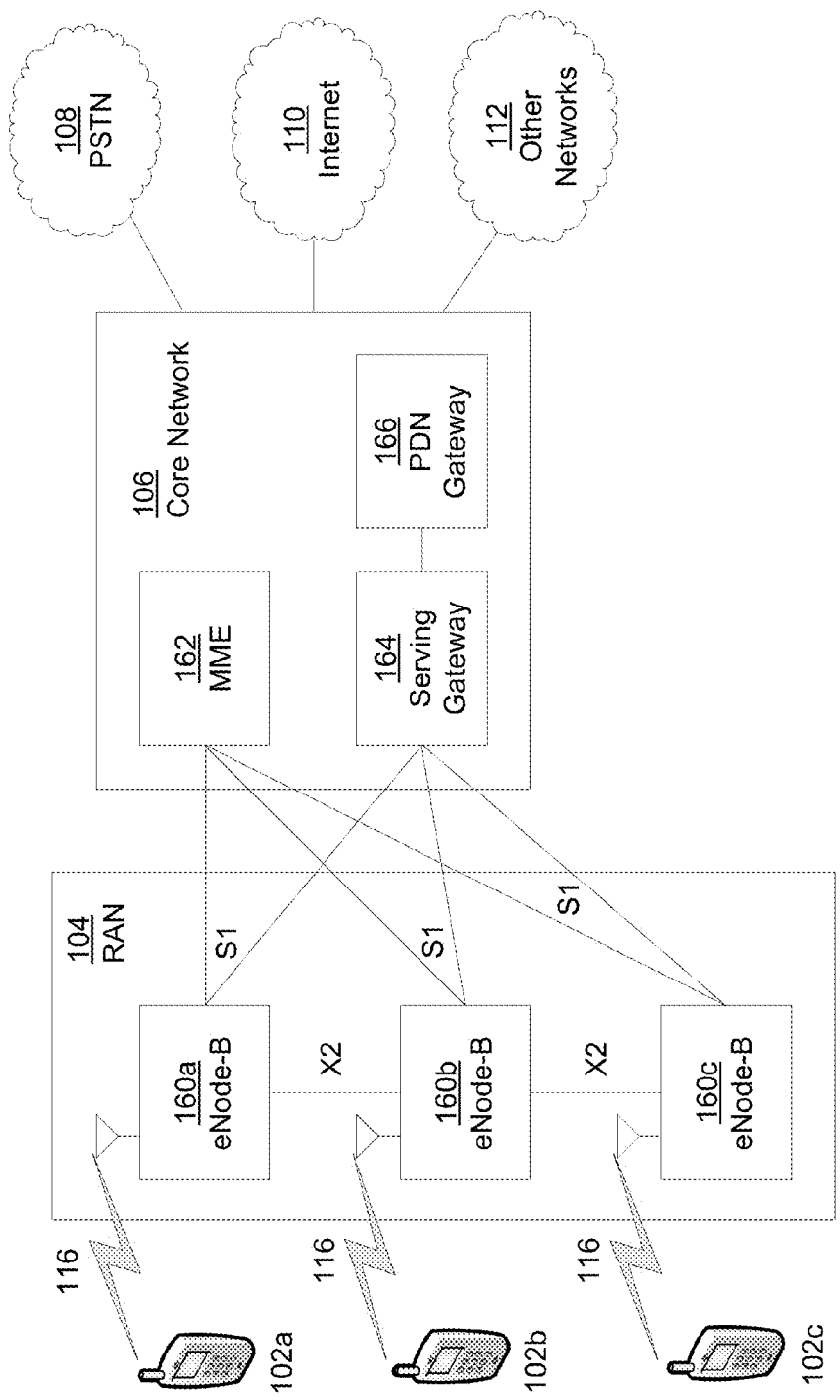
FIG. 1D is a system diagram of an another example radio access network and an another example core network that may be used within the communications system illustrated in FIG. 1A.

FIG. 1D is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
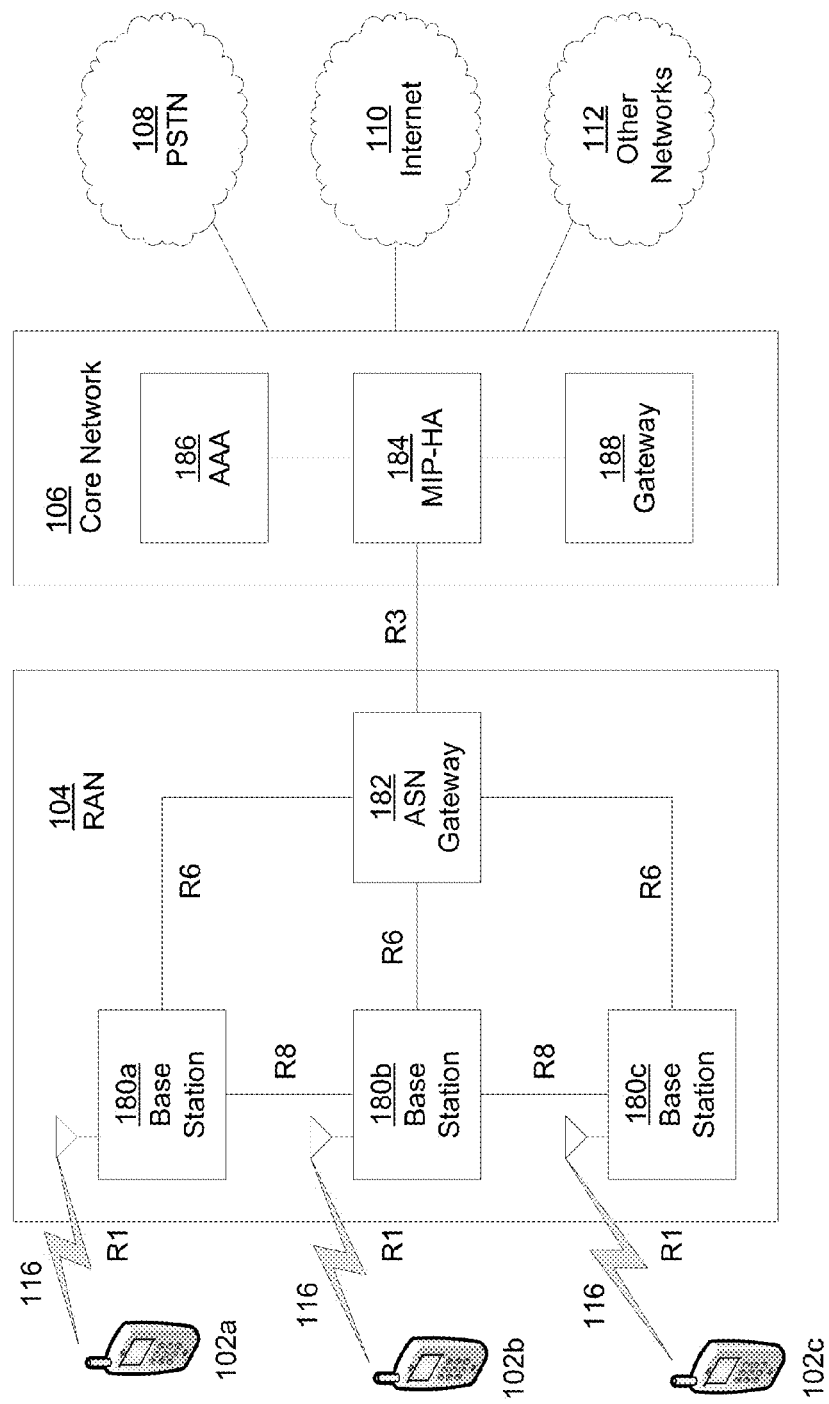
FIG. 1E is a system diagram of an another example radio access network and an another example core network that may be used within the communications system illustrated in FIG. 1A.

FIG. 1E is a system diagram of the RAN 104 and the core network 106 according to an embodiment. The RAN 104 may be an access service network (ASN) that employs IEEE 802.16 radio technology to communicate with the WTRUs 102a, 102b, 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 180a, 180b, 180c, and an ASN gateway 182, though it will be appreciated that the RAN 104 may include any number of base stations and ASN gateways while remaining consistent with an embodiment. The base stations 180a, 180b, 180c may each be associated with a particular cell (not shown) in the RAN 104 and may each include one or more transceivers for communicating with the WTRUs 102a, 102b, 102c over the air interface 116. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may be defined as an R3 reference point that includes protocols for facilitating data transfer and mobility management capabilities, for example. The core network 106 may include a mobile IP home agent (MIP-HA) 184, an authentication, authorization, accounting (AAA) server 186, and a gateway 188. While each of the foregoing elements are depicted as part of the core network 106, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

Figure 2:
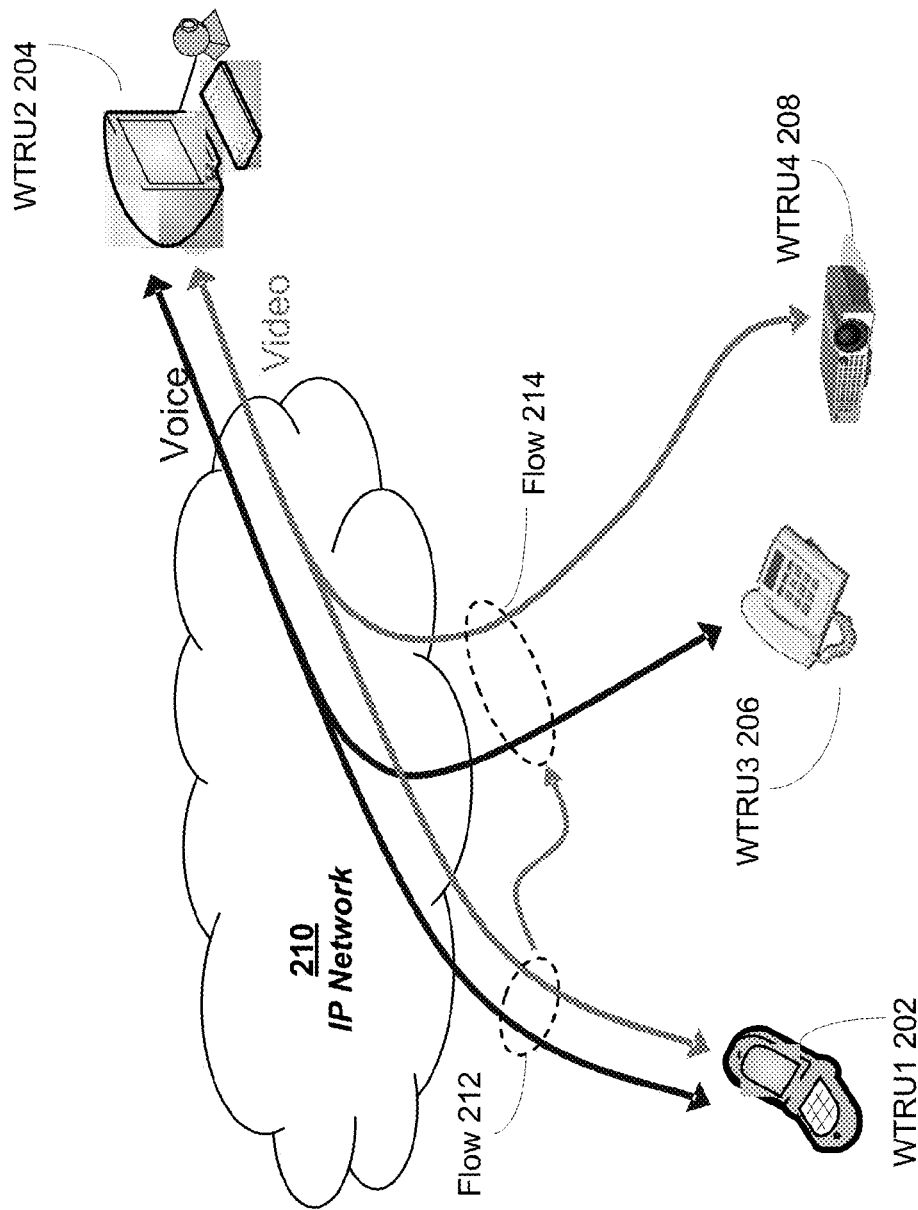
FIG. 2 illustrates an example architecture of IMS-based services and service continuity.

FIG. 2 illustrates an example system architecture in which embodiments may be implemented. As shown in FIG. 2, multiple devices such as WTRU1 202, WTRU2 204, WTRU3 206, and WTRU4 208 may communicate via IP Network 210. The WTRUs may communicate via a wireless communication protocol and/or a wired communications protocol. For example, WTRU1 202 may establish a communication session with WTRU2 204. For example, WTRU1 202 and WTRU2 204 may establish a streaming video conference. In this example, the streaming data may include voice data and video data. Upon establishing the streaming video conference, the combined voice and video data may be sent between WTRU1 202 and WTRU2 204 via Flow 212 over IP Network 210. Flow 212 may include voice and or video data between WTRU1 202 and WTRU2 204.

During the pendency of Flow 212, it may be desirable for the voice and or video data from WTRU2 204 to be redirected to a device other than WTRU1 202. For example, the user of WTRU1 202 may have been traveling during the establishment of Flow 212, but now has arrived at the user's office. In this example, it may be desirable to transfer all or part of Flow 212 to one or more different devices. For example, the user of WTRU1 202 may decide to transfer the voice data of Flow 212 to WTRU3 206 and the video data of Flow 212 to WTRU4 208. Upon transferring the voice and video data to WTRU3 206 and WTRU4 208, respectively, the new data flow may be referred to as Flow 214.

Figure 3:
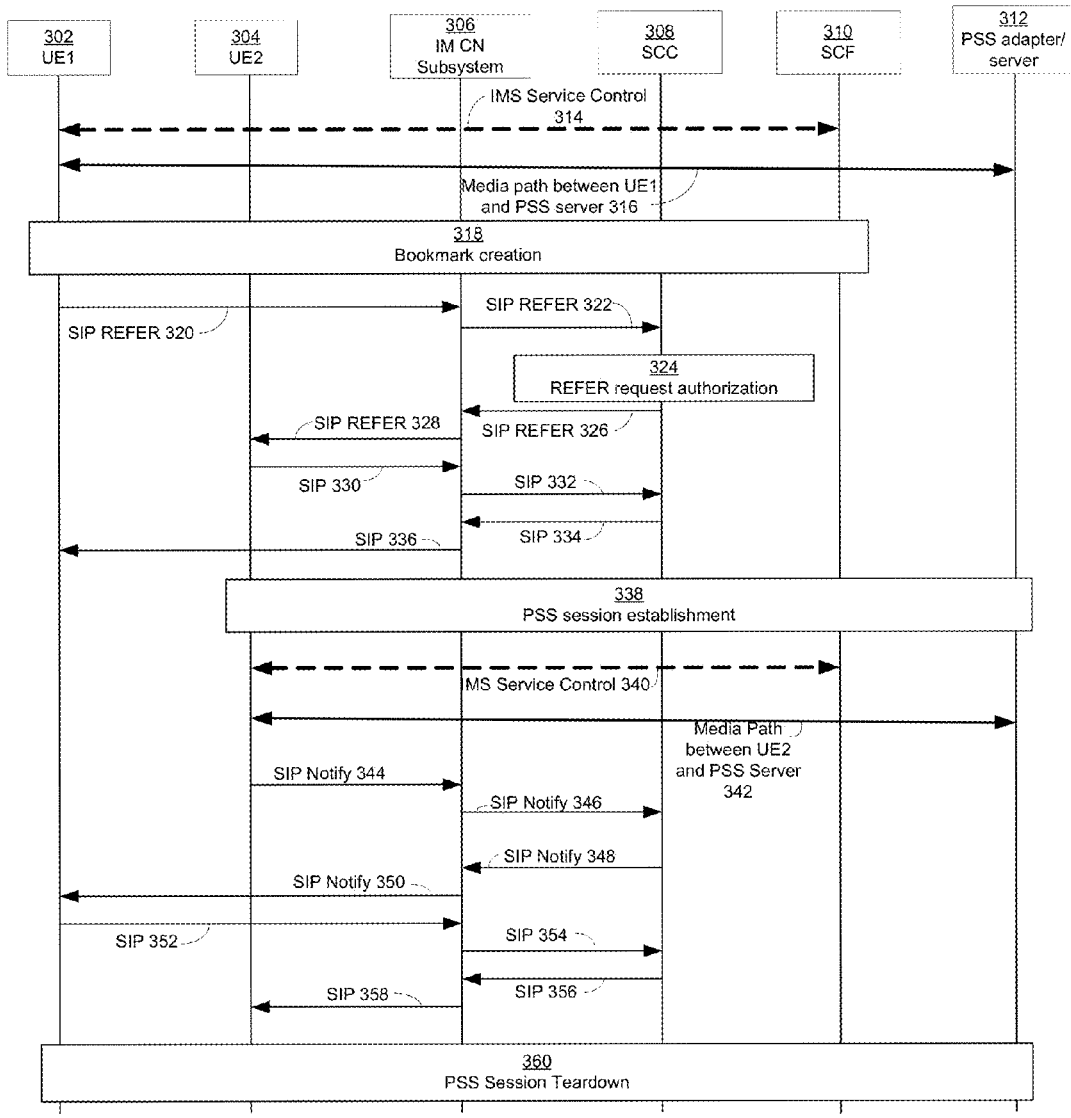
FIG. 3 an exemplary flow chart of signaling during an IMS-based push mode (with a PSS server)

FIG. 3 illustrates an example messaging diagram in which UE1 302 has established an IMS session with PSS adapter/server 312. In this example, UE1 302 may transfer the data session to UE2 304 using IMS protocols. An IUT may be used for the transfer of an ongoing PSS session from a transferor (UE1 302) to a transferee (UE2 304). IUT may include the transfer of the session control as well as the media flows. In this example, UE1 302 and UE2 304 may be under the same user subscription and may be served by the same Service Control Function (SCF) 310. Additionally, an inter UE session transfer may follow, for example, the general Inter UE session transfer procedures as defined in 3GPP TS 23.237: "IP Multimedia Subsystem (IMS) Service Continuity; Stage 2" and 3GPP TS 24.237: "IP Multimedia Subsystem (IMS) Service Continuity; Stage 3." In push mode, the session transfer may be initiated by UE1 302.

The information flow in FIG. 3 shows the transfer of the IMS session with PSS adapter/server 312 from UE1 302 to UE2 304. SIP REFER 320, SIP REFER 322, REFER request authorization 324, SIP REFER 326, SIP REFER 328, SIP 330, SIP 332, SIP 334, SIP 336, SIP Notify 344, SIP Notify 346, SIP Notify 348, SIP Notify 350, SIP 352, SIP 354, SIP 356, and SIP 358 may be in accordance with the session transfer procedure as defined in clause 15 of 3GPP TS 24.237: "IP Multimedia Subsystem (IMS) Service Continuity; Stage 3." The sequence may be simplified, for example by omitting session progress messages. IMS Service Control 314 may control Media path between UE1 and PSS adapter/server 316. A IMS controlled PSS sessions between UE1 302 and PSS adapter/server 316 may allow for a media stream. UE1 302 may initiate Bookmark creation 318, for example a bookmark creation in accordance with clause 12.1 of 3GPP TS 26.237 "IP Multimedia Subsystem (IMS) based Packet Switch Streaming (PSS) and Multimedia Broadcast/Multicast Service (MBMS) User Service; Protocols."

SIP REFER 320 may initiate the inter UE transfer to UE2 304 and may be sent from UE1 302 to IMS Core Network (IM CN) Subsystem 306. IM CN Subsystem 306 may send SIP REFER 322 to Service Centralization and Continuity (SCC) 308. SCC 308 may process the request for IUT at REFER request authorization 324. SCC 208 may forward the request via SIP 326 back to IM CN Subsystem 306, which may further forward the request to UE2 304 via SIP REFER 328. UE2 304 may respond via SIP 330 to IM CN Subsystem 306. IM CN Subsystem 306 may forward the response to SCC 308 via SIP 332, which may forward the response to IM CN Subsystem 306 via SIP 334, which may further forward the response to UE1 302 via SIP 336. PSS session establishment 338 may then be initiated using the bookmark, for example initiated in accordance with clause 12.2.2 of 3GPP TS 26.237 "IP Multimedia Subsystem (IMS) based Packet Switch Streaming (PSS) and Multimedia Broadcast/Multicast Service (MBMS) User Service; Protocols," wherein PSS adapter/server 312 is informed of the transfer from UE1 302 to UE2 304. Upon PSS session establishment 338, IMS Service Control 340 may control the session established via Media path between UE2 and PSS adapter/server 342.

In order to teardown the Media path between UE2 and PSS adapter/server 342, SIP Notify 344 may be sent from UE2 304 to IM CN Subsystem 306. The IM subsystem 306 may forward the request via SIP Notify 346 to SCC 308. SCC 308 may forward the request to IM CN Subsystem 306 via SIP Notify 348, which forwards the request to UE1 302 via SIP Notify 350. UE1 302 may accept the teardown by sending SIP 352 to IM CN Subsystem 306, which forwards the acceptance to SCC 308 via SIP 354, which may forward the acceptance to IM CN Subsystem 306 via SIP 356, which may forward the acceptance to UE2 304 via SIP 358. PSS session Teardown 360 may then be completed, and PSS adapter/server 312 may be informed that the session has reverted to UE1 302, for example in accordance with clause 8.2.6.1.1 of 3GPP TS 26.237 "IP Multimedia Subsystem (IMS) based Packet Switch Streaming (PSS) and Multimedia Broadcast/Multicast Service (MBMS) User Service; Protocols."

As may be appreciated, the IMS session transfer procedure may require a large amount of signaling overhead and requires all parties for the session to be informed that a session transfer is going to occur. Additionally, devices may need to support the IMS protocol in order to make use of the IMS session transfer procedure. Embodiments contemplate a procedure whereby at least on party to a session or data flow may be unaware that a session or flow transfer has occurred. Embodiments also contemplate a transfer protocol whereby devices that may not support IMS and/or SIP may initiate and engage in IUT.

Figure 4:
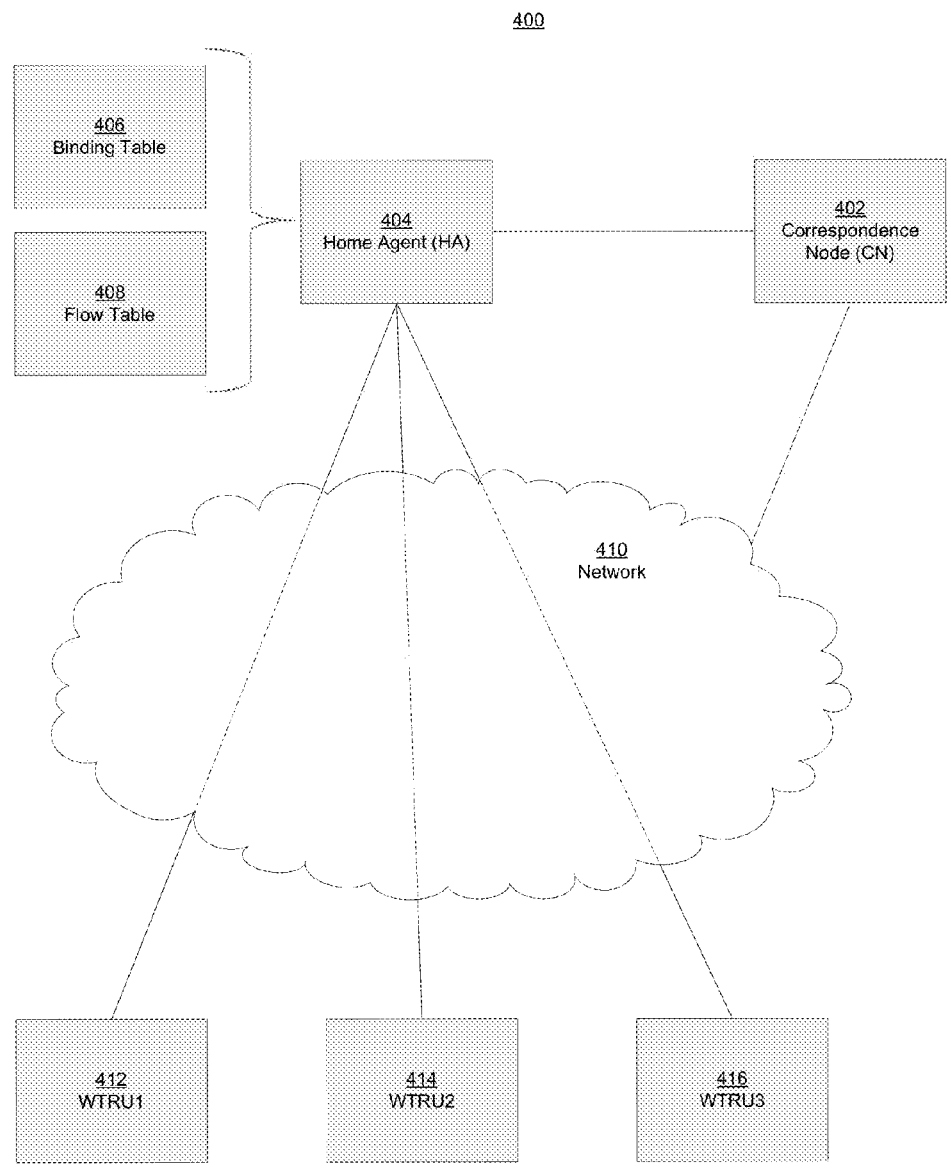
FIG. 4 illustrates an example system diagram with a single home agent in which an embodiment may be implemented.

FIG. 4 is an example system architecture 400 in which embodiments may be implemented. Correspondence Node (CN) 402 may communicate with WTRU1 412, WTRU2 414, and/or WTRU3 416. For example, CN 402 may establish a communication session with WTRU1 412 which includes voice data and video data. The communication session may be referred to as data flow or simply a flow. In order to allow for the mobility of WTRU1 412, WTRU2 414, and/or WTRU3 416 without updating the addresses for those devices by CN 402, CN 402 may communicate with WTRU1 412, WTRU2 414, and/or WTRU3 416 via Home Agent (HA) 404. HA 404 may keep an updated listing of addresses for WTRU1 412, WTRU2 414, and/or WTRU3 416 in Binding Table 406. For example, WTRU1 412 may have an actual IP address in Network 410. This actual IP address may be referred to as a Care-of-address (CoA). An IP packet addressed for the CoA of WTRU1 may be routed in Network 410 to WTRU1 412. Similarly, both WTRU2 414 and WTRU3 416 may have CoAs which correspond to their actual network IP address in Network 410. WTRU1 412, WTRU2 414, and/or WTRU3 416 may register their CoAs with HA 404. HA 404 may associate the CoA for WTRU 412 with a Home Address (HoA). A HoA may be a proxy address for a given CoA. For example, a HoA issued by HA 404 may cause IP packets addressed for the HoA to be routed to HA 404 in Network 410. By associating a HoA with a CoA in Binding Table 406, HA 404 may then route packets addressed for the HoA to the CoA where a device is located.

As an example, suppose WTRU1 412 registered CoA1 with HA 404. HA 404 may create an entry in Binding Table 406 for WTRU1 412. The entry may include CoA1. Additionally, HA 404 may create HoA1, which may be the proxy address for WTRU1 412. HoA1 may be associated with CoA1 in Binding Table 406 and may further include a Binding Identification (BID), which in this example may be BID1. A WTRU may generate a BID for each CoA and send the BID to the HA. Alternatively, the HA may generate the BID and inform the UE. Thus, in this example, a unique entry containing HoA1, BID1, and CoA1 may be created in Binding Table 406. In an example, HA 404 may inform WTRU1 412 of HoA1. When establishing a communication session with another device, for example CN 402, WTRU1 412 may indicate that its address is HoA1. Therefore, packets sent during the session that are destined for WTRU1 412 may be addressed for HoA1. Packets addressed for HoA1 may be routed to HA 404. HA 404 may receive a packet addressed for HoA1, may use Binding Table 406 to determine CoA1, and may forward the packet to WTRU1 412 using CoA1. By registering in this way, WTRU1 412 may move throughout Network 410, which may include changing its CoA, for example to CoA2. In this scenario, WTRU1 412 may send a binding update (BU) to HA 404 to update Binding Table 406 to indicate the HoA1 and BID1 should now be associated with CoA2. The binding entry may be a HoA/BID/CoA triplet. This procedure may allow for mobility of WTRU1 412 without the need to update CN 402 each time WTRU1 412 changes its CoA.

In another example, WTRU1 412 may include multiple interfaces. In this example each interface may include an associated CoA. WTRU1 412 may register each interface, and respective CoA, with HA 404 so that they may be included in Binding Table 406. In this example, all of the interfaces for WTRU1 412 may share the same HoA, for example HoA1. However, each interface may be assigned a different BID so that the interfaces and their corresponding CoAs may be uniquely identified in Binding Table 406. For example, WTRU1 412 may include Interface 1 at CoA1. The entry for Interface 1 in Binding Table 406 may be HoA1/BID1/CoA1. Similarly, WTRU1 412 may include Interface 2 at CoA2. The entry for Interface 2 in Binding Table 406 may be HoA1/BID2/CoA2. Therefore, if HA 404 identifies a packet that is associated with HoA1 and BID1, it may recognize the CoA using the entry in Binding Table 406 and route the packet to Interface 1 via CoA1. Similarly, if HA 404 identifies a packet that is associated with HoA1 and BID2, it may recognize the CoA using the entry in Binding Table 406 and route the packet to Interface 2 via CoA2. In another embodiment, the entries may be uniquely identified using a User Equipment Identification (UEID). A UEID may be included in Binding Table 406.

For communication sessions in which a large amount of data or a data stream is being sent to a device registered with HA 404, a data flow or flow may be established. A flow may be a set of IP packets that match a traffic selector. A flow may be a sequence of packets for which a WTRU desires special handling by the HA. A traffic selector may be one or more parameters that may be matched against fields in a packet's header for the purpose of classifying a packet. Examples of such parameters may include the source and/or destination IP addresses, transport protocol number, the source and destination port numbers, other fields in IP and higher layer headers and the like. In order to identify a flow at the HA, a flow binding may be created, for example in Flow Table 408. A flow table may exist for each HoA registered with HA. A flow binding may be a traffic selector and an action. IP packets from one or more flows that match the traffic selector associated with the flow binding may be processed according to the action associated with the flow binding. A flow may be uniquely identified by a flow identifier (FID). For example, a FID may be generated by a WTRU1 412 and sent to HA 404 so that the FID may be included in the table of flow binding entries maintained by HA1 404 in Flow Table 408.

For example, with reference to FIG. 4, a flow may be established between CN 402 and WTRU1 412. WTRU1 412 may inform HA 404 of the creation of the flow. WTRU1 412 may inform HA 404 of a FID for the flow and may instruct HA 404 to forward packets associated with the flow using a specified HoA and BID. For example, WTRU1 412 may sending a binding update to HA 404 that includes FID1 for a flow associated with CN 402 and WTRU1 412. The binding update may also include an instruction to route packets associated with FID1 using a HoA1/BID1 pair, for example using a Binding Reference Sub-option. The binding reference sub-option may associate a flow with one or more registered BIDs. The HoA1/BID1 pair may be associated with CoA1 in Binding Table 406. Upon receiving the binding update, HA 404 may create an entry in Flow Table 408 for the flow associated with CN 402 and WTRU1 412. The entry may include FID1, a traffic selector created by HA 404 and the action, in this case forward to CoA1, indicated by WTRU1 412 in the binding update. Alternatively, WTRU1 412 may send the traffic selector to HA 404 as part of the binding update or in a different message. If a packet received by HA 404 matches the created traffic selector, it may be routed using the HoA/BID pair included in the flow table. For example, if an incoming packet matches the traffic selector associated with FID1, HA 404 may identify HoA1/BID1 as the destination of the packet using Flow Table 408. In another example the packet may be routed based on BID1, for instance if each BID in the binding table is associated with a unique HoA. HA 404 may then route the packet using CoA1, which may be identified using Binding Table 406.

After establishing the flow between CN 402 and WTRU1 412, it may be desirable for the flow to be transferred to one or more different devices. For example, suppose the flow between CN 402 and WTRU1 412, for example Flow1, contains voice data and video data. WTRU1 412 may desire to transfer the voice data from Flow1 to WTRU2 414 and the video data from Flow1 to WTRU3 416. WTRU1 412 may also desire that the transfer occur transparently, i.e., CN 402 is unaware that Flow1 has been transferred from WTRU1 412 to WTRU2 414 and WTRU3 416. Embodiments contemplate several ways WTRU1 412, WTRU2 414, and WTRU3 416 may send binding updates to one or more HAs, such as HA 404, such that a transparent transfer of a flow may occur.

Figure 5:
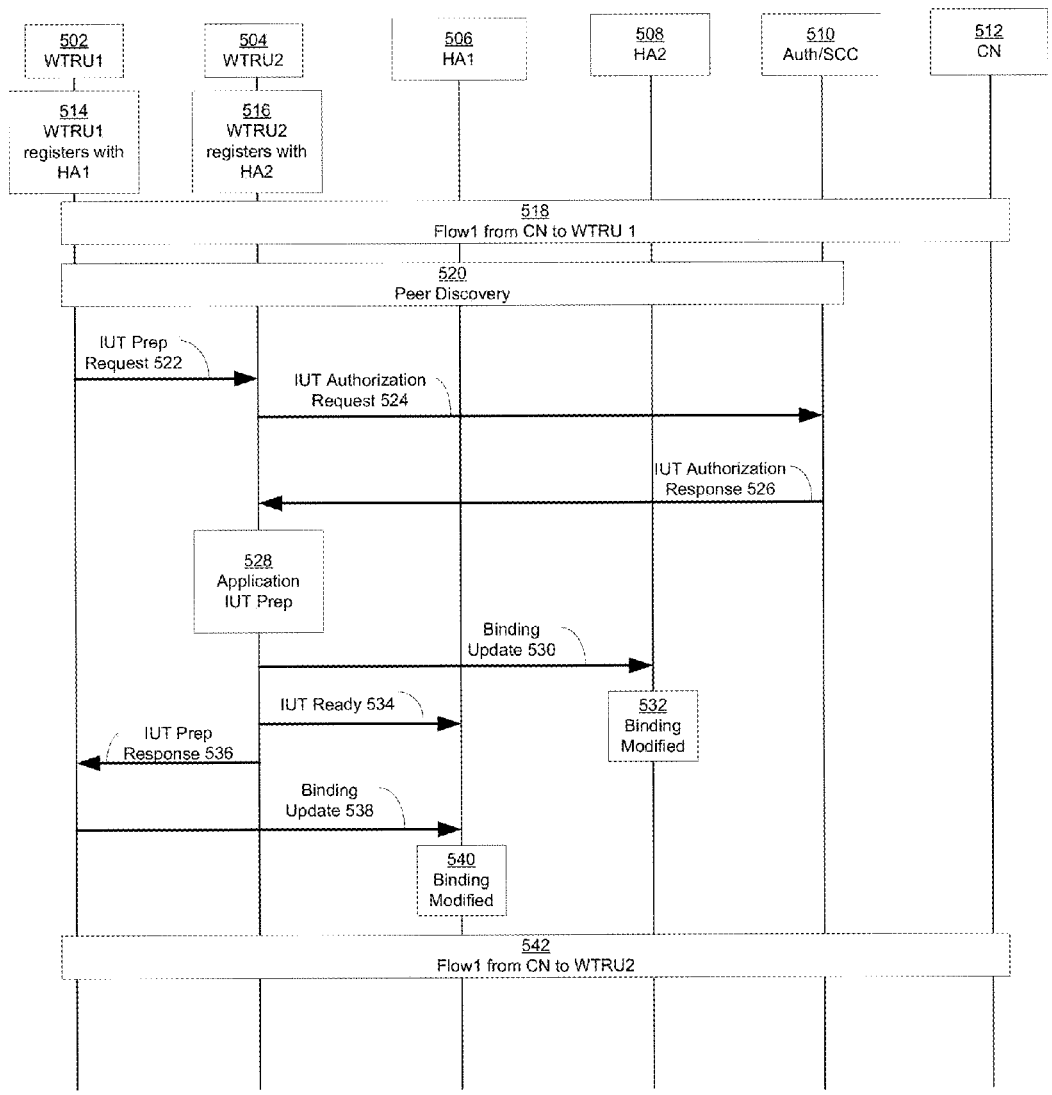
FIG. 5 illustrates an example signal diagram for requesting and authorizing a flow transfer in accordance with an embodiment.

Prior to initiating a flow transfer, one or more of the WTRUs involved in the transfer, one or more nodes involved in the transfer (for example a HA), or one or more CNs may request the initiation of the flow transfer, request authorization for the flow transfer, and/or ensure that each device involved in the transfer is capable of supporting the flow transfer. For example, FIG. 5 illustrates an example signal diagram in which a device may request and authorize a flow transfer. With reference to FIG. 5, WTRU1 502 and WTRU2 504 may be devices capable of accepting and using flows. HA1 506 and HA2 508 may be home agents capable of supporting mobility of devices such as WTRU1 502 and WTRU2 504. Authorization/Service Centralization Continuity (Auth/SCC) 510 may be a node capable of managing session continuity and authentication at a global level (e.g., managing multiple HAs). Auth/SCC 510 may be a separate node in the system or may be part of another node, for example HA1 506 or HA2 508.

As shown in FIG. 5, WTRU1 502 may register with HA1 506 at 514. Registration may be in the form of a binding update. The binding update may include a BID and a CoA for WTRU1 502, for example BID1 and CoA1. HA1 506 may use BID1 and CoA1 received from WTRU1 502 to update a binding table entry for WTRU1 502. HA1 506 may generate a HoA, for example HoA1, for WTRU1 502. The binding table entry for WTRU1 502 may include HoA1, BID1, and/or CoA1. HA1 506 may send HoA1 to WTRU1 502 in a binding acknowledgment message which may indicate that WTRU1 502 has successfully registered with HA1 506. Similarly, WTRU2 504 may register with HA2 508 at 516. Registration may be in the form of a binding update. The binding update may include a BID and a CoA for WTRU2 504, for example BID2 and CoA2. HA2 508 may use BID2 and CoA2 received from WTRU2 504 to update a binding table entry for WTRU2 504. HA2 508 may generate a HoA, for example HoA2, for WTRU2 504. The binding table entry for WTRU2 504 may include HoA2, BID2, and/or CoA2. HA2 508 may send HoA2 to WTRU2 504 in a binding acknowledgement message which may indicate that WTRU2 504 has successfully registered with HA2 508.

After registering with HA1 506, WTRU1 502 may desire to create a flow with CN 512. At 518, Flow1 from CN 512 to WTRU1 502 may be created. Flow1 may be established in a manner similar to the one described with reference to FIG. 4. For example, WTRU1 502 may send HA1 506 a binding update which includes a FID, for example FID1, and a traffic selector. The traffic selector may be used to identify packets associated with the flow based on a packet header. HA1 506 may create an entry in a flow table for Flow1. The flow table entry may include FID1, the traffic selector sent by WTRU1 502 and an action to be performed on packets that match the traffic selector. For example, the action may be an instruction to forward the packet to CoA1. In another example, the action may be to forward the packet to HoA1. In another example, the action may be to forward the packet using a binding entry associated with BID1. In another example, the action may be to forward the packet using an entry in the binding table which may be uniquely identified using a HoA/BID pair, for example HoA1/BID1. In this example, if HA1 receives a packet that matches the traffic selector, it would use the HoA1/BID1 pair to identify CoA1 as the intended address of the packet based on a HoA1/BID1/CoA1 binding entry. Upon creation of the entry in the flow table for Flow1, HA1 506 may send a binding acknowledgement to WTRU1 502. WTRU1 502 may then send packets as part of Flow1 to CN 512 using HoA1 as its address. CN 512 may address packets included in Flow1 to HoA1. Packets addressed to HoA1 may be routed to HA1 506. HA1 506 may match the packet header to the traffic selector for Flow1, and route the packet to WTRU1 502 based on the created entries in its flow table and binding table. This packet forwarding may be referred to as tunneling.

After establishment of Flow1, the destination of the Flow1 may be changed. For example, all or some of the packets associated with Flow1 may be routed to WTRU2 504 instead of WTRU1 502. At 520, WTRU1 502 may participate in peer discovery. Peer discovery may be initiated by WTRU1 502 or may be initiated by another device, for example WTRU2 504, HA1 506, HA2 508, and/or Auth/SCC 510. During peer discovery WTRU1 502 may discover WTRU2 504. WTRU1 502 and WTRU2 504 may exchange relevant information, for example addressing information. The addressing information may include HoAs (e.g., HoA1 and/or HoA2), CoAs (e.g., CoA1 and/or CoA2), HA information (e.g., addresses or other identifying indicia for HA1 506 and HA2 508), and the like. Once WTRU1 502 has discovered WTRU2 504, WTRU1 502 may contact WTRU2 504 for IUT preparation and authorization. For example, as shown in FIG. 5, WTRU1 502 may send IUT Prep Request 522 to WTRU2 504. IUT Prep Request 522 may contain information regarding the type of or identity of an application utilizing Flow1, and may request WTRU2 504 to accept the transfer of Flow1. As another example, IUT Prep Request 522 may include application data from an application associated with Flow1. For example, if Flow1 includes video data, example application data may be a video codec. As may be appreciated, application data may be a variety of information specific to the application utilizing Flow1. In another example, IUT Prep Request 522 may include information regarding the identity or other identifying information for HA1 506, for example an IP address. IUT Prep Request 522 may contain information regarding the identity, address, characteristics, and or the like for CN 512.

Upon receiving IUT Prep Request 522, WTRU2 504 may verify that it is allowed to accept the transfer. For example, WTRU2 504 may check its local configuration to ensure it may support the transfer of Flow1. In an example embodiment, WTRU2 504 may check with its HA (e.g., HA2 508) to ensure that transfer of Flow1 is supported, for example if the flow is to be routed through HA2 508. WTRU2 504 may determine if it is authorized to accept the transfer of Flow1. For example, as shown in FIG. 5, WTRU2 504 may send IUT Authorization Request 524 to Auth/SCC 510 which may act as a session controller. In an embodiment, Auth/SCC 510 may be logically contained within another network node, for example HA1 504 or HA2 506. IUT Authorization Request 524 may include a variety of information such as, but not limited to, information regarding WTRU1 502, information regarding WTRU2 504, the identity of the application utilizing Flow1, data specific to the application utilizing Flow1, etc. In another embodiment, WTRU2 504 may include local configuration policy information and other information allowing it to locally determine whether IUT is allowed. In this example, IUT Authorization Request 524 may be optional. If AUTH/SCC 510 determines that IUT is allowed, it may indicate as such in IUT Authorization Response 526, which may be sent to WTRU2 504. Alternatively, AUTH/SCC 510 may deny the IUT and indicate as such in IUT Authorization Response 526.

If Auth/SCC 510 authorizes an IUT for Flow1 in IUT Authorization Response 526, at 528 WTRU2 504 may begin Application IUT preparation. For example, WTRU2 504 may start the application associated with Flow1 on WTRU2 504. WTRU2 504 may pass information associated with Flow1 to the local application associated with Flow1. WTRU2 504 may initiate a procedure that prepares a local application for the receipt of data associated with Flow1. HA2 508 may be informed of the IUT. For example, WTRU2 504 may send Binding Update 530 to HA2 508 instructing HA2 508 to update its binding table and/or flow table. Sending Binding Update 530 to HA2 508 may be optional, as the transfer may be transparent to HA2 508 as will be discussed in more detail below. However, if HA2 is instructed to perform a binding update via Binding Update 530, at 532 it may modify its binding table and/or flow table. In an example embodiment, WTRU2 504 may send IUT Ready 534 to HA1 506 to inform HA1 506 that WTRU2 504 is ready for the IUT. WTRU2 504 may send IUT Prep Response 536 to WTRU1 502 to inform WTRU1 502 that WTRU2 504 accepts the IUT and/or that WTRU2 504 is ready for the IUT.

WTRU1 502 may send Binding Update 538 to HA1 506. Binding Update 538 may include a traffic selector which may be used to route packets associated with Flow1 to WTRU2 504. The details of the binding update, modified binding table, modified flow table, and/or the method of redirecting the packets will be discussed in more detail below. At 540, HA1 506 modifies its flow table and/or binding table based on the information contained in Binding Update 538. After modifying one or more tables, at 542 Flow1, which may still be addressed to HoA1 by CN 512, may be routed by HA1 506 to WTRU2 504. The packets associated with Flow1 may be routed through HA2 508 or may be routed directly to WTRU2 504 by HA1 506, as is discussed in more detail below. The transfer of Flow1 from WTRU1 502 to WTRU2 504 may be transparent to CN 512. The protocol used for IUT preparation and/or authorization may be a distinct protocol or may be a protocol adapted for IUT. For example, the protocol may include an IUT preparation request and response messages, IUT authorization request and response messages, and/or IUT ready indicator messages.

In an example embodiment, the MIPv6 protocol may be modified to support IUT. For example, a mobility option may be defined in MIPv6 for the purpose of supporting IUT. The mobility option may be included in many types of MIP messages, for example a binding update message, a binding acknowledgement message, a binding refresh message and/or the like. In another example embodiment, the SIP protocol may be modified in order to support IUT. For example, an SDP Message Body with payload-type set to "IUT" and/or a Content-type set to "application/IUT" may be used to support IUT requests and authorization. In another example, a mix of protocols may be used to transport IUT messages. For example, A new protocol may be used for direct communication between the WTRUs between which the transfer is occurring, MIP messages may be used to transport IUT information between a WTRU and a HA or between two HAs, and/or SIP may be used to transport the IUT information between an HA and an SCC. As may be appreciated this combination is example, and the combination of protocols may vary. An example of a mixed protocol authorization will be described in more detail below with reference to FIG. 7.

Figure 6:
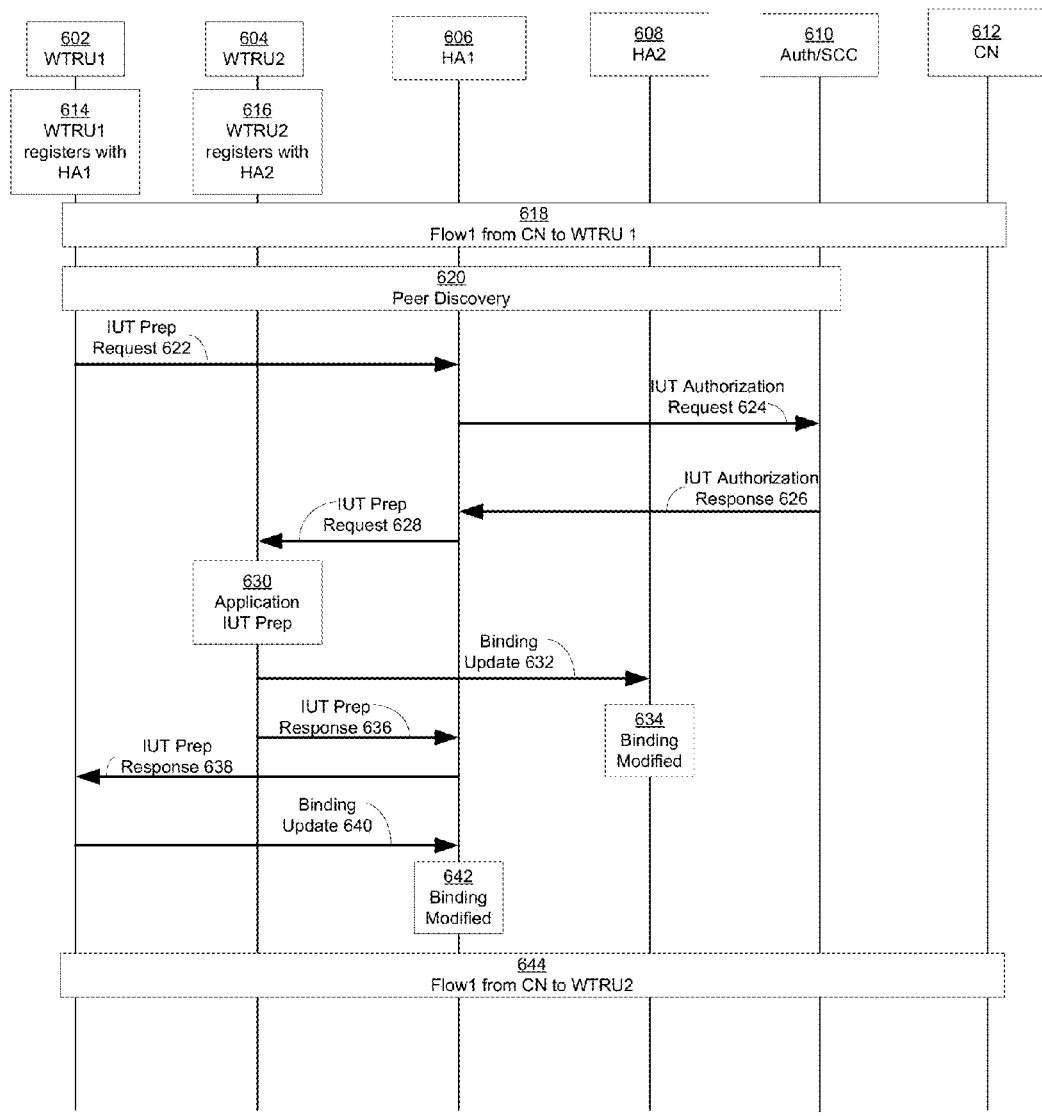
FIG. 6 illustrates an another example signal diagram for requesting and authorizing a flow transfer in accordance with an embodiment.

FIG. 6 illustrates another example IUT request and authorization scenario. In this example, rather than direct communication between the WTRUs involved in the transfer, requests and authorizations are sent to and from the WTRUs via the HAs. For example, as shown in FIG. 6, WTRU1 602, WTRU2 604, HA1 606, HA2 608, Auth/SCC 610, and CN 612 may be involved in the flow routing and/or IUT. At 614 WTRU1 602 registers with HA1 606, and at 616 WTRU2 604 registers with HA2 608. The registration may be performed in a manner similar to the methods described above. At 618 Flow1 may be established between CN 612 and WTRU1 602. At 620 WTRU1 602, WTRU2 604, HA1 606, HA2 608 and/or Auth/SCC 610 may engage in peer discovery. For example, WTRU1 602 may discover WTRU2 604. WTRU1 602 and WTRU2 604 may exchange relevant information, for example addressing information. The addressing information may include HoAs, CoAs, HA information, and the like. WTRU1 602 may send IUT Prep Request 622 to HA1 606 which may request an IUT and/or request authorization for an IUT. IUT Prep Request 622 may contain information regarding the type of or identity of an application utilizing Flow1. In an embodiment, IUT Prep Request 622 may include application data from an application associated with Flow1. For example, if Flow1 includes video data, example application data may be a video codec. As may be appreciated, application data may be a variety of information specific to the application utilizing Flow1. An example IUT Prep Request 622 may include information regarding the identity or other identifying information for WTRU2 604, for example an IP address, a HoA, and/or a CoA. IUT Prep Request 622 may contain information regarding the identity, address, characteristics, and or the like of CN 612.

Upon receipt of IUT Prep Request 622, HA1 606 may verify or determine if IUT is allowed for Flow1. In an embodiment, HA1 606 may engage in actions to prepare WTRU2 604 for receipt of Flow1. HA1 606 may send IUT Authorization Request 624 to Auth/SCC 610. IUT Authorization Request 624 may include a variety of information such as, but not limited to, information regarding WTRU1 602, information regarding WTRU2 604, the identity of the application utilizing Flow1, data specific to the application utilizing Flow1, etc. In another embodiment, HA1 606 may include local configuration policy information and other information allowing it to locally determine whether IUT is allowed. For example, Auth/SCC 610 may be a logical part of HA1 606. In another example, IUT Authorization Request 624 may be sent to HA2 608 to request authorization for IUT. Upon determining if IUT is authorized, Auth/SCC 610 may send IUT Authorization Response 626 to HA1 606. Auth/SCC 610 may accept or deny the IUT request. If IUT is authorized, IUT Prep Request 628 may be sent from HA1 606 to WTRU2 604. IUT Prep Request 628 may contain information regarding the type of or identity of an application utilizing Flow1. In an embodiment, IUT Prep Request 628 may include application data from an application associated with Flow1. An example IUT Prep Request 628 may include information regarding the identity or other identifying information for WTRU1 602, for example an IP address, a HoA, and a CoA. IUT Prep Request 628 may contain information regarding the identity, address, characteristics, and or the like of CN 612.

At 630 WTRU2 604 may begin Application IUT preparation. For example, WTRU2 604 may start the application associated with Flow1 on WTRU2 604. WTRU2 604 may pass information associated with Flow1 to the local application associated with Flow1. WTRU2 604 may initiate a procedure that prepares a local application for the receipt of data associated with Flow1. HA2 608 may be informed of the IUT. For example, WTRU2 604 may send Binding Update 632 to HA2 608 instructing HA2 608 to update its binding table and/or flow table. Sending Binding Update 632 to HA2 608 may be optional, as the transfer may be transparent to HA2 608 as will be discussed in more detail below. However, if HA2 608 is instructed to perform a binding update via Binding Update 632, at 634 HA2 608 may modify its binding table and/or flow table. In an example embodiment, WTRU2 604 may send IUT Prep Response 636 to HA1 606 to inform HA1 606 that WTRU2 604 is ready for the IUT. HA1 606 may send IUT Prep Response 638 to WTRU1 602 to inform WTRU1 602 that IUT has been authorized and/accepted. IUT Prep Response 638 may also indicate that WTRU2 604 is ready for the IUT.

WTRU1 602 may send Binding Update 640 to HA1 606. Binding Update 640 may include a traffic selector which may be used to route packets associate with Flow1 to WTRU2 604. The details of the binding update, modified binding table, modified flow table, and/or the method of redirecting the packets will be discussed in more detail below. At 642, HA1 606 may modify its flow table and/or binding table based on the information contained in Binding Update 640. After modifying one or more tables, at 644, Flow1, which may still be addressed to HoA of WTRU1 602 by CN 612, may be routed by HA1 606 to WTRU2 604. The packets associated with Flow1 may be routed through HA2 608 or may be routed directly to WTRU2 604 by HA1 606, as is discussed in more detail below. The transfer of Flow1 from WTRU1 602 to WTRU2 604 may be transparent to CN 612.

Figure 7:
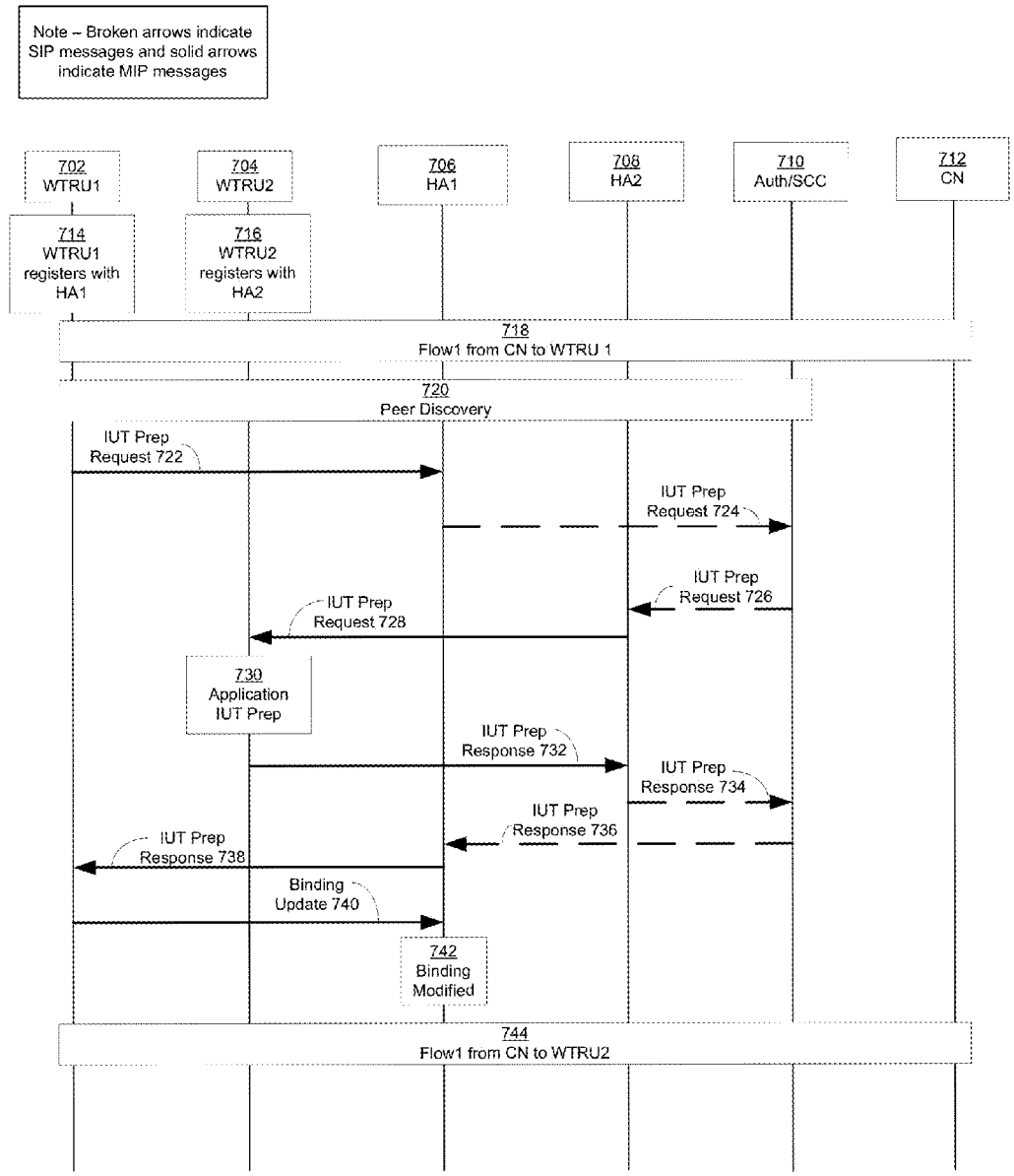
FIG. 7 illustrates an example signal diagram for requesting and authorizing a flow transfer using mixed protocols in accordance with an embodiment.

FIG. 7 illustrates an example signaling diagram for the request and authorization of an IUT through the use of a modified mix of MIP and SIP protocols. Solid arrows in FIG. 7 may represent MIP messages and broken arrows may indicate SIP messages. In this example embodiment, MIP messages may be used for communications between a WTRUs and/or HAs and SIP messages may be used for communication with an Auth/SCC. As shown in FIG. 7, WTRU1 702, WTRU2 704, HA1 706, HA2 708, Auth/SCC 710, and CN 712 may be involved in the flow routing and/or IUT. At 714 WTRU1 702 may register with HA1 706, and at 716 WTRU2 704 may register with HA2 708. The registration may be performed in a manner similar to the methods described above. At 718 Flow1 may be established between CN 712 and WTRU1 702. At 720 WTRU1 702, WTRU2 704, HA1 706, HA2 708 and/or Auth/SCC 710 may engage in peer discovery. For example, WTRU1 702 may discover WTRU2 704. WTRU1 702 and WTRU2 704 may exchange relevant information, for example addressing information. The addressing information may include HoAs, CoAs, HA information, and the like. WTRU1 702 may send IUT Prep Request 722 to HA1 706 which may request an IUT and/or request authorization for an IUT. IUT Prep Request 722 may be a modified MIP message. IUT Prep Request 722 may contain information regarding the type of or identity of an application utilizing Flow1. In an embodiment, IUT Prep Request 722 may include application data from an application associated with Flow1. An example IUT Prep Request 722 may include information regarding the identity or other identifying information for WTRU2 704, for example an IP address, a HoA, and/or a CoA. IUT Prep Request 722 may contain information regarding the identity, address, characteristics, and or the like of CN 712.

Upon receipt of IUT Prep Request 722, HA1 606 may verify or determine if IUT is allowed for Flow1. In an embodiment, HA1 706 may engage in actions to prepare WTRU2 704 for receipt of Flow1. HA1 706 may send IUT Prep Request 724 to Auth/SCC 710. IUT Prep Request 724 may be a modified SIP message. IUT Prep Request 724 may include a variety of information such as, but not limited to, information regarding WTRU1 702, information regarding WTRU2 704, the identity of the application utilizing Flow1, data specific to the application utilizing Flow1, etc. In another embodiment, HA1 706 may include local configuration policy information and other information allowing it to locally determine whether IUT is allowed. For example, Auth/SCC 710 may be a logical part of HA1 706. In another example, IUT Prep Request 724 may be sent to HA2 708 to request authorization for IUT. IUT Prep Request 726 may be a modified SIP message and may include a variety of information such as, but not limited to, information regarding WTRU1 702, information regarding WTRU2 704, the identity of the application utilizing Flow1, data specific to the application utilizing Flow1, etc. Upon determining if IUT is allowed, Auth/SCC 710 may send IUT Prep Request 726 to HA2 708. IUT Prep Request 728, which may be a modified MIP message, may be sent from HA2 708 to WTRU2 704. IUT Prep Request 728 may contain information regarding the type of or identity of an application utilizing Flow1. In an embodiment, IUT Prep Request 728 may include application data from an application associated with Flow1. An example IUT Prep Request 728 may include information regarding the identity or other identifying information for WTRU1 702, for example an IP address, a HoA, and/or a CoA. IUT Prep Request 728 may contain information regarding the identity, address, characteristics, and or the like of CN 712.

At 730 WTRU2 704 may begin Application IUT preparation. For example, WTRU2 704 may start the application associated with Flow1 on WTRU2 704. WTRU2 704 may pass information associated with Flow1 to the local application associated with Flow1. WTRU2 704 may initiate a procedure that prepares a local application for the receipt of data associated with Flow1. WTRU2 704 may inform HA2 708 that is ready for the IUT by sending IUT Prep Response 732. For example, upon receiving IUT Prep Response 732, which may be a modified MIP message, HA2 708 may send IUT Prep Response 734 to Auth/SCC 710, which may be a modified SIP message. Auth/SCC 710 may inform HA1 706 that WTRU2 704 is ready for the IUT by sending IUT Prep Response Message 736, which may be a modified MIP message. HA1 706 may send IUT Prep Response 738, which may be a modified MIP message, to WTRU1 702 to inform WTRU1 702 that IUT has been authorized and/or accepted. IUT Prep Response 738 may also indicate that WTRU2 704 is ready for the IUT.

WTRU1 702 may send Binding Update 740 to HA1 706. Binding Update 740 may be a modified MIP message and may include a traffic selector which may be used to route packets associate with Flow1 to WTRU2 704. The details of the binding update, modified binding table, modified flow table, and/or the method of redirecting the packets will be discussed in more detail below. At 742, HA1 706 may modify its flow table and/or binding table based on the information contained in Binding Update 740. After modifying one or more tables, at 744, Flow1, which may still be addressed to HoA of WTRU1 702 by CN 712, may be routed by HA1 706 to WTRU2 704. The packets associated with Flow1 may be routed through HA2 708 or may be routed directly to WTRU2 704 by HA1 706, as is discussed in more detail below. The transfer of Flow1 from WTRU1 702 to WTRU2 704 may be transparent to CN 712. Note in this example sequence the binding and/or flow tables of HA2 708 were not updated through a binding update message. In other example, the binding table and/or flow table for HA2 708 may be updated to support the IUT.

In order to support IUT and device mobility, procedure may be defined to provide an IUT of a flow which is transparent to the source of the flow. To allow for multiple CoAs to be associated with a single HoA, BIDs may be added to a HA binding table. Each CoA associated with a HoA may have an associated unique BID. A WTRU, during registration with a HA, may generate a unique BID for each CoA it registers. Thus a WTRU may register multiple CoAs which each are associated with the same HoA. Entries in a flow table for an HA may be defined such that a particular flow may be associated with one or more CoAs. A binding entry may be created in a HA flow table for this purpose. A binding entry may bind a particular flow to one or more CoAs without affecting other flows which may use the same HoA. Traffic selectors may be used to identify flows by comparing the traffic selector with incoming IP packets. Actions may be specified for IP packets that match the traffic selector. Example actions may include DELETE or FORWARD. If an incoming packet matches a traffic selector whose associated action is DELETE, the packet may be discarded by the HA. If an incoming packet matches a traffic selector whose associated action is FORWARD, the packet may be routed to a specified address.

In an example embodiment, all devices associated with a specific subscriber may be registered with a HA associated with the subscriber and share the same HoA. For example, WTRU1, WTRU2, and WTRU3 may be devices associated with a first subscriber. Each device may register with the HA for that subscriber and each may be assigned a HoA, for example HoA1. The registration may be accomplished via a Binding Update message sent from the device (e.g., WTRU1, WTRU2, and/or WTRU3) to the HA. Different binding entries, which may share the same HoA (e.g., HoA1), may be created in the binding table of the HA. Each device may include a unique BID in the binding update when they register with the HA. In another example embodiment, a unique identifier which may supplement or replace the BID/HoA pair. The unique identifier may be a User Equipment Identification (UEID). If the devices are assigned UEIDs, then binding entries in the binding table of the HA (i.e., entries that correspond to a unique CoA) may be uniquely identified using a HoA/BID/UEID triplet. For example, if the HoA is different for each WTRU, binding entries may be uniquely identified using either HoA/BID or UEID/BID (for MIP message exchange between the WTRUs and the HAs). The triplet (HoA/BID/UEID) may be used to uniquely identify a binding entry in the case where the HoA is shared between multiple WTRUs.

To allow for IUT between devices which are located at different HoAs or registered with different HAs, the Flow binding table may be modified to uniquely identify a BID amongst WTRUs. In one embodiment, a HoA may be added to the flow binding entry. In another example, a BID may be added to the flow binding table. In another example, both the HoA and the BID may be added to the flow binding table. If, for example, the devices are all under the same subscription, then the UEIDs of the device may be added to the flow binding table in order to uniquely identify the action to take when the flow matches a traffic selector for the flow binding entry being modified.

To ensure that a flow may be transferred to other devices, the usage of flow bindings may be enforced for each device that registers with a HA. For example, a device may register with a HA even if it is currently located in the local network where the HA resides. In another example, the device may use route optimization. In another example, the UE may use a different procedure that makes uses of flow bindings but may remain unregistered in the binding table of the HA. As a note, the following binding update procedures are described with reference to binding and flow binding tables for a HA. As may be appreciated embodiments contemplate similar procedures being implemented on CNs and mobility agents.

Figure 8:
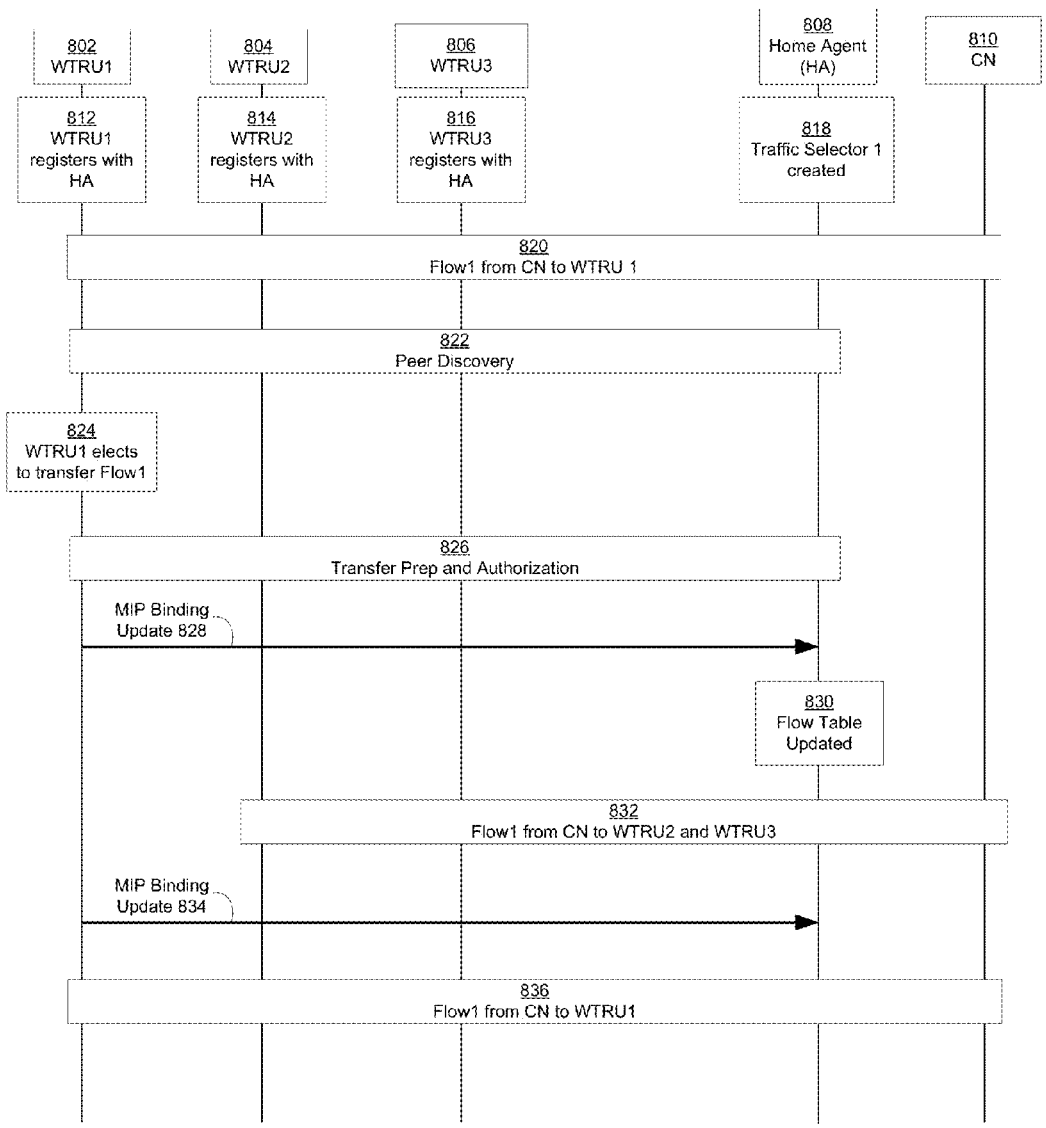
FIG. 8 illustrates an example IUT sequence flow with a single home agent.

FIG. 8 illustrates an example signaling diagram for updating the binding and flow tables for a HA. In this example. A flow from CN 810 to WTRU1 802 may be transferred to WTRU2 804 and WTRU3 806. At 812, WTRU1 802 registers with HA 808. For example, WTRU1 802 may send a Binding Update to HA 808 that may include CoA1 (i.e., the CoA where WTRU1 802 is located) and BID1 which may be a BID unique to WTRU1 802. Note that BID1 may be unique to WTRU1 but may be repeated for HA 808. For example, at 814 WTRU2 804 may register with HA 808. WTRU2 804 may send HA 808 a BID. The BID sent by WTRU2 804 may be the same as BID1 sent by WTRU1 802. However, each entry in the binding table of HA 808 may be uniquely identified by the HoA/BID pair since WTRU1 802 and WTRU2 804 may be assigned different HoAs. Alternatively, if WTRU1 802 and WTRU2 804 are assigned the same HoA, for example if they belong to the same subscriber, the binding table may optionally include unique UEIDs for WTRU1 and WTRU2 so that the corresponding binding entry for each device may be uniquely identified.

Continuing with the example shown in FIG. 8, at 816 WTRU3 806 registers with HA 808 in a manner similar to WTRU1 802 and WTRU2 804. Upon completion of registration of WTRU1 802, WTRU2 804, and WTRU 806, three entries may be created in the binding table for HA 808. An example section of binding table is shown below in Table 1.

TABLE 1

| Home Address (HoA) | Binding ID (BID) | Care-of-Address (CoA) |
|---|---|---|
| HoA1 | BID1 | CoA1 |
| HoA2 | BID2 | CoA2 |
| HoA3 | BID1 | CoA3 |

The first entry may correspond to WTRU1 802, the second entry may correspond to WTRU2 804, and the third entry may correspond to WTRU3 806. Each CoA may be uniquely identified based on the HoA/BID pair.

At 818, a first traffic selector may be created in the flow table for HA 808. For example, WTRU1 802 may send HA 808 a binding update including the traffic selector and a request to forward the packets that match the traffic selector using HoA1/BID1. A traffic selector may be, for example, one or more parameters or filter that may be used to classify a packet. Alternatively, WTRU1 802 may request that HA 808 forward the matching packets using CoA1. WTRU1 802 may also send HA 808 a flow identification (FID) which is unique for the flow. Alternatively, HA 808 may determine the FID and may or may not send the FID to WTRU1 802. Upon acceptance of binding update, HA 808 may send WTRU1 802 a binding acknowledgement and may update its flow table. The created flow may be referred to as Flow1. An example entry in the flow table of HA 808 for Flow1 is shown in Table 2. A flow table may be created for each HoA registered with HA 808.

TABLE 2

| Flow Identification (FID) | Traffic Selector | Action |
|---|---|---|
| FID1 | Filter for Flow1 | Forward to HoA1/BID1 |

Upon the creation of the flow binding entry, for example the entry shown in Table 2, HA 808 may now route packets that are part of Flow1. For example, CN 810 may be a streaming media server containing video and voice data. WTRU1 802 may establish a communication session with CN 810 and may indicate to CN 810 that the address for WTRU1 802 is HoA1. At 820, Flow 1 may be routed to CN 810. CN 810 may address packets for WTRU1 802 that are part of Flow1 to HoA1. The packets addressed for HoA1 may be routed to HA 808. Upon receiving Flow1 packets addressed for HoA1, HA 808 may compare the received packets to the traffic selectors contained in its flow table. The packets for Flow 1 may match the Filter for Flow1 traffic selector as shown in Table 2. HA 808 may then forward the Packets Using the HoA1/BID1 pair. HA 808 may identify CoA1 as the routing address unique to HoA1/BID1 pair based on its binding table. HA 808 may tunnel the packets to WTRU1 802 located at CoA1.

In an example embodiment, WTRU1 802 may correspond to a smart phone for a subscriber. WTRU2 804 may correspond to a TV for a subscriber. WTRU3 806 may correspond to a sound system for a subscriber. Continuing with this example, the subscriber may have established Flow1 while located in a different locale than WTRU2 804 and WTRU 806. Upon entering the locale containing WTRU3 804 and WTRU4 806, the subscriber may desire to perform an IUT such that the video data from Flow1 is redirected to WTRU2 804 and the sound data for Flow1 is redirected to WTRU3 806. As an example, WTRU1 802 may initiate peer discovery 822 in order to perform an IUT. WTRU1 802, WTRU2 804, WTRU3 806, and/or HA 808 may exchange information during peer discovery 822. For example, the devices may exchange information such as their respective HoAs, BIDs, CoAs, FIDs, traffic selectors and the like. At 824, WTRU1 802 may elect to transfer the flow to WTRU2 804 and/or WTRU3 806. At 826, WTRU1 802 may send application specific data to the target devices (e.g., WTRU2 804 and/or WTRU3 806). For example, if WTRU2 804 is to receive the video data, WTRU1 802 may send WTRU2 804 a video codec. If WTRU3 806 is to receive the sound data, WTRU1 802 may send WTRU3 806 an audio codec. WTRU1 802 may send WTRU2 804 and WTRU 806 HoA1 such that WTRU2 804 and WTRU3 806 may configure HoA1 on a local port such that WTRU2 804 and WTRU3 806 may continue the download with CN 810 seamlessly.

WTRU1 802 may send MIP Binding Update 828 to HA 808 to update the Flow Table. For example, WTRU1 802 may send a binding update that creates a traffic selector for Flow1 video data with a corresponding action to forward the data to WTRU2 804. For example, WTRU1 802 may instruct HA 808 to forward the data to CoA2 or forward the data using the HoA2/BID2 pair. Similarly, MIP Binding Update 828 may create a traffic selector for Flow1 sound data with a corresponding action to forward the data to WTRU3 806. For example, WTRU1 802 may instruct HA 808 to forward the data to CoA3 or forward the data using the HoA3/BID1 pair. MIP Binding Update 828 may delete the traffic selector for WTRU1 802. At 830, HA 808 updates the flow table. An example updated flow binding table is shown in Table 3.

TABLE 3

| Flow Identification (FID) | Traffic Selector | Action |
|---|---|---|
| FID1 | | |
| FID2 | Filter for Flow1 Video | Forward to HoA2/BID2 |
| FID3 | Filter for Flow1 Sound | Forward to HoA3/BID1 |

Note that the entry in Table 3 for FID1 is shown for purposes of illustration. The FID 1 entry may be completely removed for the flow table, the action may deleted, and/or the traffic selector may be deleted. At 832, Flow1 from CN 810 is routed to WTRU2 804 and WTRU3 806 by HA 808.

The user may intend to transfer the flow back to WTRU1 802. For example, WTRU1 802 may send MIP binding update 834 to HA 808. MIP binding update 834 may create a traffic selector that matches all packets for Flow1 and may create a corresponding action to forward the packets to WTRU1 802. MIP binding update 834 may also delete the traffic selectors or flow entries for WTRU2 804 and WTRU3 806 which correspond to Flow1. For example, after receipt of MIP binding update 834, HA 808 may update the flow table to reflect the entries shown in Table 2. After updating the flow table, at 836 HA 808 may begin redirecting Flow1 packets to WTRU1 802.

Figure 9:
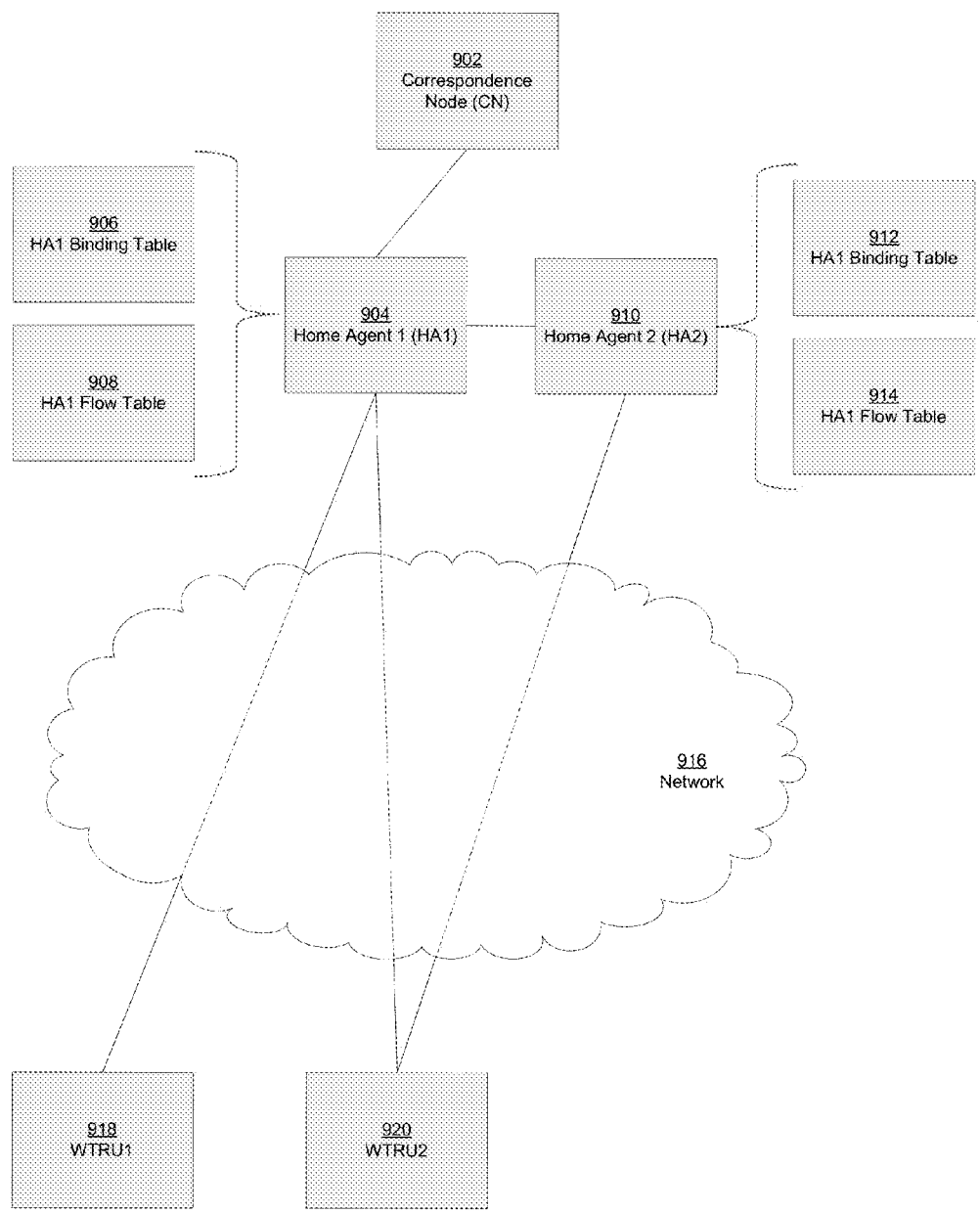
FIG. 9 illustrates an example system diagram with two home agents in which an embodiment may be implemented.
Figure 10:
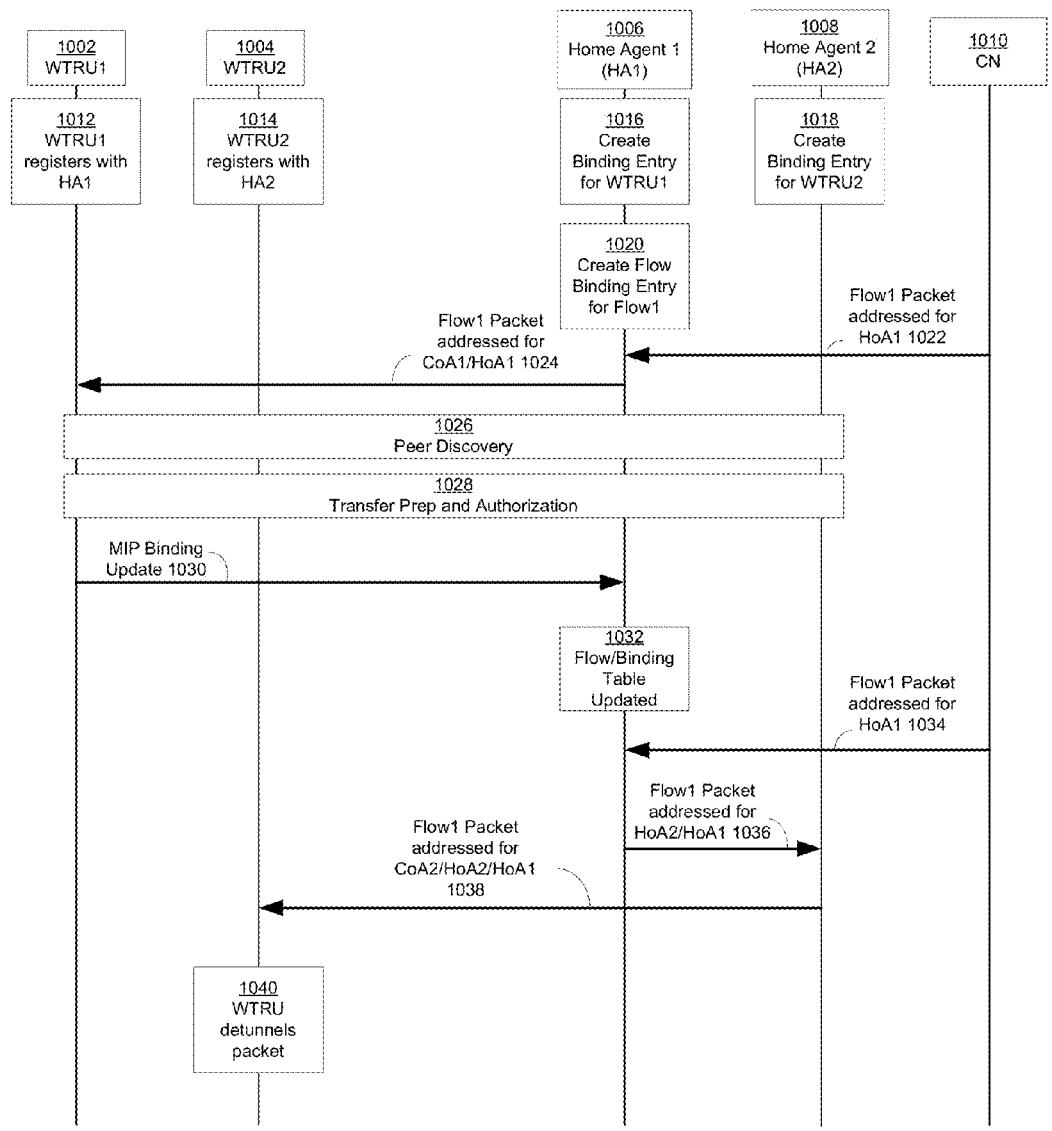
FIG. 10 illustrates example IUT sequence flow with two home agents using double tunneling.
Figure 11:
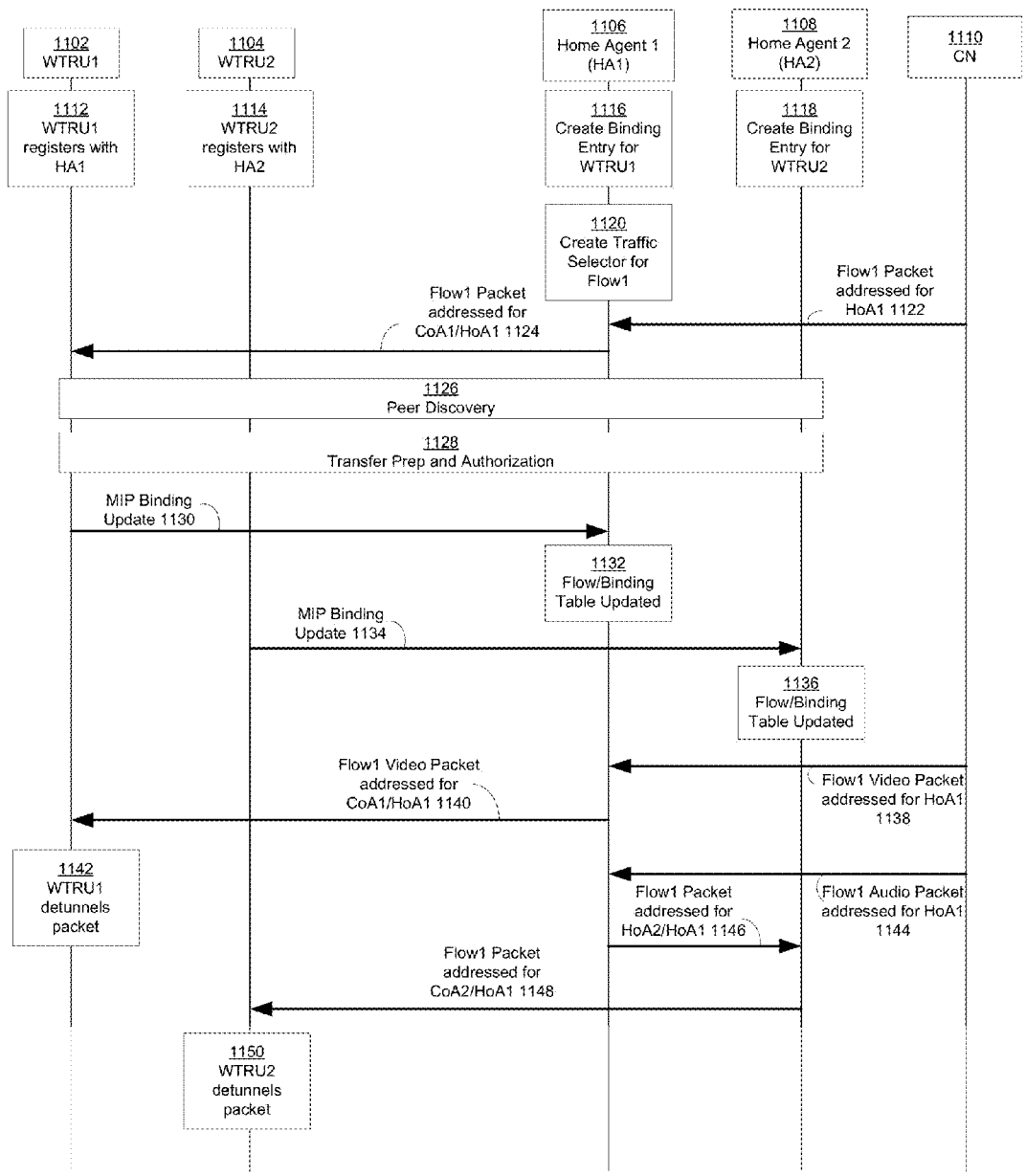
FIG. 11 illustrates example IUT sequence flow with two home agents using two tunnels.
Figure 12:
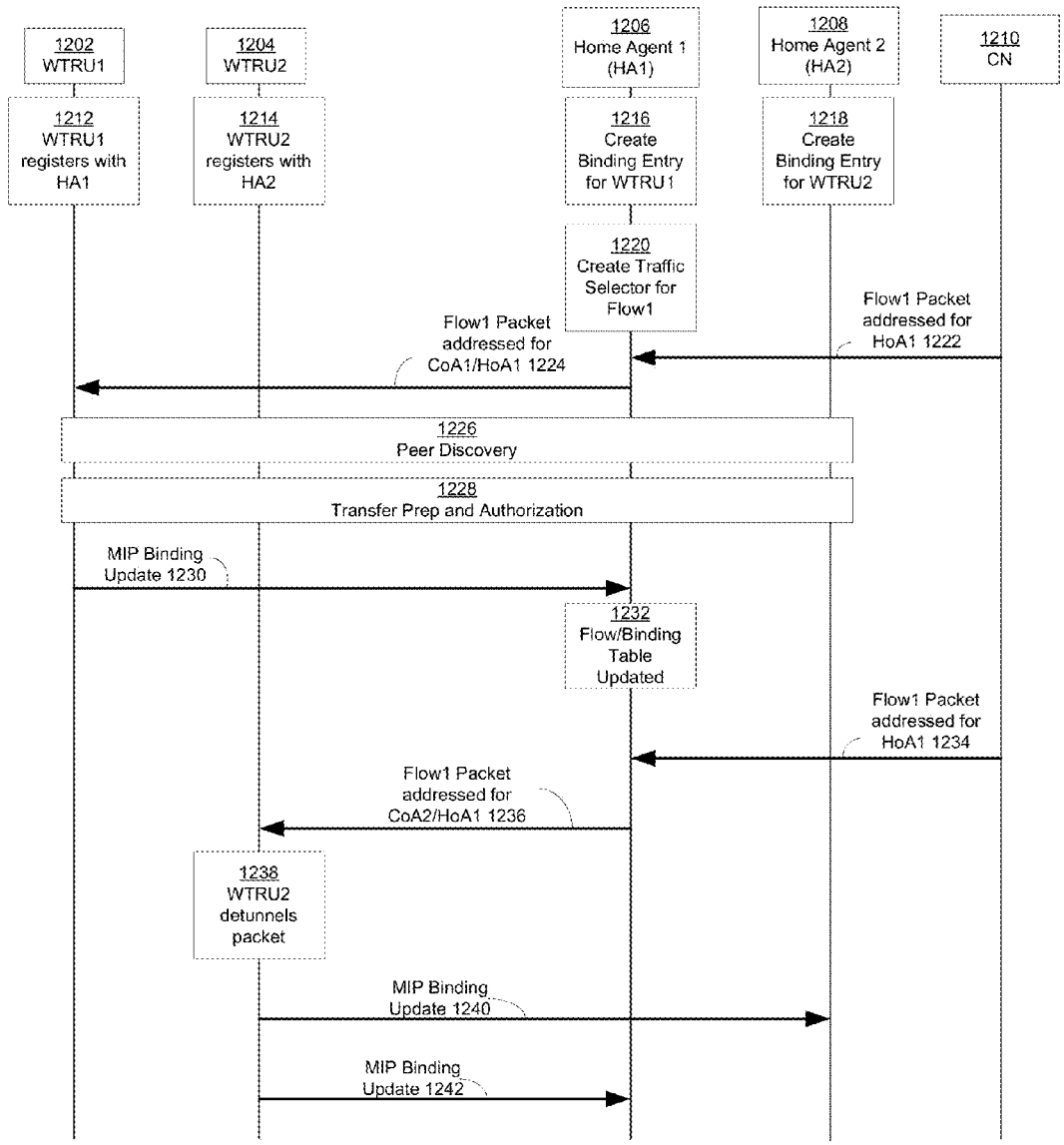
FIG. 12 illustrates example IUT sequence flow with two home agents using a single tunnel.

Embodiments contemplate seamless and transparent IUTs when multiple HAs may be involved. For example, FIG. 9 illustrates an example architecture in which embodiments may be implemented. As shown in FIG. 9, CN 902 may be a source of flow data. For example, CN 902 may be a streaming media server. Although not shown in FIG. 9, CN 902 may access Network 916. HA1 904 and HA2 910 may be HAs capable of communicating with Network 916. HA1 904 may include Binding Table 906 and Flow Table 908. HA2 910 may include Binding Table 912 and Flow Table 914. WTRU1 918 may be a device in communication with Network 918. In an example, WTRU1 918 may register with HA1 904. Similarly, WTRU2 920 may be a device in communication with Network 918, and WTRU1 920 may register with HA1 904 and or HA2 910. For example, a flow may be established between CN 902 and WTRU1 918 via HA1 904. A user may desire to transfer the flow to WTRU2 920, which may be registered with HA2 910. FIG. 10, FIG. 11, and FIG. 12 illustrate example signaling diagrams for IUTs which may be implemented in the architecture shown in FIG. 9.

FIG. 10 illustrates an example signaling diagram for an IUT sequence flow using double tunneling. WTRU1 1002 and WTRU2 1004 may be device capable of receiving flows. HA1 1006 and HA2 1008 may be HAs that may facilitate an IUT and device mobility. CN 1010 may be a source of a flow. For example, CN 1010 may be a content source, such as a video server. At 1012 WTRU1 1002 may register with HA1 1006. For example, WTRU1 1002 may send a binding update which may include a CoA and/or a BID. For purposes of illustration, WTRU1 1002 may send CoA1 and BID1 to HA1 1006 in order to register with HA1 1006. HA1 1006 may send a binding acknowledgement to WTRU1 1002, which may include a HoA. For instance, HA1 1006 may send HoA1 to WTRU1 1002, which may act as a HoA for WTRU1 1002. At 1014 WTRU2 1004 may register with HA2 1008. For example, WTRU2 1004 may send a binding update which may include a CoA and/or a BID. For purposes of illustration, WTRU2 1004 may send CoA2 and BID2 to HA2 1008 in order to register with HA2 1008. HA2 1008 may send a binding acknowledgement to WTRU2 1004, which may include a HoA. For instance, HA2 1008 may send HoA2 to WTRU2 1004, which may act as a HoA for WTRU2 1004. At 1016 HA1 1006 may create a binding entry for WTRU1 1002. An example binding entry for HA1 1006 is shown in Table 4, below.

TABLE 4

| Home Address (HoA) | Binding ID (BID) | Care-of-Address (CoA) |
|---|---|---|
| HoA1 | BID1 | CoA1 |

At 1018 HA2 1008 may create a binding entry for WTRU2 1004. An example binding entry for HA2 1008 is shown in Table 5, below.

TABLE 5

| Home Address (HoA) | Binding ID (BID) | Care-of-Address (CoA) |
|---|---|---|
| HoA2 | BID2 | CoA2 |

WTRU1 1002 may establish a flow for data from CN 1010. To establish the flow, WTRU1 1002 may send a binding update to HA1 1006 that may include a traffic selector for the flow. For example, the flow from CN 1010 may be referred to as Flow1, and the traffic selector may match all or part of a header of a packet that is associated with Flow1. In another example the traffic selector may be any filter or identifying indicia that provided HA1 1006 a way of identifying packets associate with Flow1. WTRU1 1002 may send an action that HA1 1006 should perform for packets which match the traffic selector. The action may be to forward the packets to HoA1/BID1. At 1020 HA1 1006 may create a flow binding entry in a flow table (or flow binding table) for Flow1. An example flow binding entry is shown in Table 6, below. The flow binding entry may be included in a flow table for HoA1.

TABLE 6

| Flow Identification (FID) | Traffic Selector | Action |
|---|---|---|
| FID1 | Filter for Flow1 | Forward to HoA1/BID1 |

CN 1010 may send Flow1 Packet addressed for HoA1 1022, for example as part of Flow1. Flow1 Packet addressed for HoA1 1022 may be routed to HA1 1006. HA1 1006 may receive Flow1 Packet addressed for HoA1 1022 and compare it to entries in the flow table for HoA1. HA1 1006 may compare Flow1 Packet addressed for HoA1 1022 to the traffic selector for FID1. Since Flow1 Packet addressed for HoA1 1022 is part of Flow1 it may match the traffic selector for FID1. HA1 1006 may forward the packet based on the HoA1/BID1 identification contained in the flow table. HA1 1006 may use the HoA1/BID1 pair to determine that CoA1 is the forwarding address for the packet based on its binding table. HA1 1006 may send Flow1 Packet addressed for CoA1/HoA1 1024 to WTRU1 1002. HA1 1006 may append the CoA1 address to the header of the received packet Flow1 Packet addressed for HoA1 1022. Appending the CoA1 address to the received packet may be referred to as tunneling. For example, HA1 1006 may tunnel the received Flow1 packet to WTRU1 1002 at CoA1. Upon receiving Flow1 Packet addressed for CoA1/HoA1 1024, WTRU1 1002 may de-tunnel the packet and forward the data contained in Flow1 Packet addressed for CoA1/HoA1 1024 to the appropriate application on WTRU1 1002 for processing.

A user and/or subscriber of WTRU1 1002 may desire to perform an IUT for Flow1. At 1026 WTRU1 1002 may perform Peer Discovery in order to facilitate the IUT. WTRU1 1002 may discover WTRU2 1004, which may be capable of accepting Flow1. At 1028, WTRU1 1002 and WTRU2 1004 may perform transfer preparation and authorization. The IUT request, information exchange, and IUT authorization may be performed in a similar manner as is described above. For example, transfer preparation and authorization may be performed in a manner similar to the manner described with reference to FIGS. 5, 6 and/or 7 above. For example, WTRU1 1002 and WTRU 1004 may exchange application and addressing information.

Upon determining that WTRU2 1004 is capable, ready and/or authorized to receive Flow1, WTRU1 1002 may send MIP Binding Update 1030 to HA1 1002 in order to perform the IUT. Although shown as a single message in FIG. 10, the information in MIP Binding UPDATE 1030 may be include in multiple messages. MIP Binding Update 1030 may include a traffic selector for Flow1 and action instructing HA1 1006 to forward the packets associated with Flow1 to WTRU2 1004. Packets not associated with Flow1 but addressed for HoA1 may still be routed to WTRU1 1002 from HA1 1006. At 1032, HA1 1006 may update its flow and/or binding table in order to facilitate the IUT based on MIP Binding Update 1030. For example, HA1 1006 may update its binding table by creating an entry for WTRU2 1004 and may update its flow table for HoA1 to include the newly received traffic selector. For example, an update binding table is shown in Table 7 and an updated flow table is shown in Table 8.

TABLE 7

| Home Address (HoA) | Binding ID (BID) | Care-of-Address (CoA) |
| --- | --- | --- |
| HoA1 | BID1 | CoA1 |
| HoA2 | BID2 | HoA2 |

TABLE 8

| Flow Identification (FID) | Traffic Selector | Action |
| --- | --- | --- |
| FID1 | | Forward to HoA1/BID1 |
| FID2 | Filter for Flow1 | Forward to HoA2/BID2 |

As shown in Table 7, a new entry may be created in the binding table of HA1 1006 for WTRU2 based on MIP Binding Update 1030. In this example, the CoA for WTRU2 1004 may be HoA2, which may be the HoA registered with HA2 1008. As shown in Table 8, a new flow binding entry may be created in the flow binding table for HoA1. In this example, the original traffic selector for Flow1 may be deleted. This may indicate that all packets associated with Flow1 may be routed based on the FID2 flow binding entry. In another example, the original traffic selector may be modified or the entire FID1 flow binding entry may be deleted.

Continuing with this example, CN 1010 may send Flow1 Packet addressed for HoA1 1034. Flow1 Packet addressed for HoA1 1034 may be routed to HA1 1006. Upon receiving Flow1 Packet addressed for HoA1 1034, HA1 1006 may identify the target address as HoA1. HA1 1006 may compare Flow1 Packet addressed for HoA1 1034 to the traffic selectors included in the flow table for HoA1. Flow1 Packet addressed for HoA1 1034 may match the traffic selector for FID2. HA1 1006 may perform the action for FID2, which may be to forward the packet to HoA2/BID2. HA1 1006 may determine an appropriate destination address for Flow1 Packet addressed for HoA1 1034 based on the HoA2/BID2 pair and the flow binding table for HA1 1006. HA1 1006 may determine that the appropriate destination is HoA2. HA1 1006 may append the HoA2 address to Flow1 Packet addressed for HoA1 1034 or tunnel Flow1 Packet addressed for HoA1 1034 to HoA2. The tunneled packet may be Flow1 Packet addressed for HoA2/HoA1 1036. HA1 1006 may send Flow1 Packet addressed for HoA2/HoA1 1036. Flow1 Packet addressed for HoA2/HoA1 1036 may be routed to HA2 1008.

Upon receiving Flow1 Packet addressed for HoA2/HoA1 1036, HA2 1008 may determine an appropriate destination address for Flow1 Packet addressed for HoA2/HoA1 1036. A flow table may exist for HoA2 on HA2 1008. If a flow table for HoA2 exists on HA2 1008, Flow1 Packet addressed for HoA2/HoA1 1036 may be compared to entries in the flow table. If a flow table does not exist, Flow1 Packet addressed for HoA2/HoA1 1036 may be tunneled based on the entry in the binding table for HoA2. For example, CoA2 may be appended to Flow1 Packet addressed for HoA2/HoA1 1036 and the packet may be tunneled to WTRU2 1004. The tunneled packet may be Flow1 Packet addressed for CoA2/HoA2/HoA1 1038. HA2 1008 may send Flow1 Packet addressed for CoA2/HoA2/HoA1 1038 to WTRU2 1004. At 1040, WTRU2 1004 may detunnel Flow1 Packet addressed for CoA2/HoA2/HoA1 1038 and forward the data to the appropriate application. The IUT of Flow1 from WTRU1 1002 to WTRU2 1004 may be transparent to CN 1010.

FIG. 11 illustrates an example signaling diagram for an IUT sequence flow using two tunnels. WTRU1 1102 and WTRU2 1104 may be device capable of receiving flows. HA1 1106 and HA2 1108 may be HAs that may facilitate an IUT and device mobility. CN 1110 may be a source of a flow. For example, CN 1110 may be a content source, such as a video server. At 1112 WTRU1 1102 may register with HA1 1106. For example, WTRU1 1102 may send a binding update which may include a CoA and/or a BID. For purposes of illustration, WTRU1 1102 may send CoA1 and BID1 to HA1 1106 in order to register with HA1 1106. HA1 1106 may send a binding acknowledgement to WTRU1 1102, which may include a HoA. For instance, HA1 1106 may send HoA1 to WTRU1 1102, which may act as a HoA for WTRU1 1102. At 1114 WTRU2 1104 may register with HA2 1108. For example, WTRU2 1104 may send a binding update which may include a CoA and/or a BID. For purposes of illustration, WTRU2 1104 may send CoA2 and BID2 to HA2 1108 in order to register with HA2 1108. HA2 1108 may send a binding acknowledgement to WTRU2 1104, which may include a HoA. For instance, HA2 1108 may send HoA2 to WTRU2 1104, which may act as a HoA for WTRU2 1104. At 1116 HA1 1106 may create a binding entry for WTRU1 1102. An example binding entry for HA1 1106 is shown in Table 9, below.

TABLE 9

| Home Address (HoA) | Binding ID (BID) | Care-of-Address (CoA) |
| --- | --- | --- |
| HoA1 | BID1 | CoA1 |

At 1118 HA2 1108 may create a binding entry for WTRU2 1104. An example binding entry for HA2 1108 is shown in Table 10, below.

TABLE 10

| Home Address (HoA) | Binding ID (BID) | Care-of-Address (CoA) |
| --- | --- | --- |
| HoA2 | BID2 | CoA2 |

WTRU1 1102 may establish a flow for data from CN 1110. To establish the flow, WTRU1 1102 may send a binding update to HA1 1106 that may include a traffic selector for the flow. For example, the flow from CN 1110 may be referred to as Flow1, and the traffic selector may be any filter or identifying indicia that provides HA1 1106 a way of identifying packets associate with Flow1. WTRU1 1102 may send an action that HA1 1106 should perform for packets which match the traffic selector. The action may be to forward the packets to HoA1/BID1. At 1120 HA1 1106 may create a flow binding entry in a flow table (or flow binding table) for Flow1. An example flow binding entry is shown in Table 11, below. The flow binding entry may be included in a flow table for HoA1.

TABLE 11

| Flow Identification (FID) | Traffic Selector | Action |
| --- | --- | --- |
| FID1 | Filter for Flow1 | Forward to HoA1/BID1 |

CN 1110 may send Flow1 Packet addressed for HoA1 1122, for example as part of Flow1. Flow1 Packet addressed for HoA1 1122 may be routed to HA1 1106. HA1 1106 may receive Flow1 Packet addressed for HoA1 1122 and compare it to entries in the flow table for HoA1. HA1 1106 may compare Flow1 Packet addressed for HoA1 1122 to the traffic selector for FID1. Since Flow1 Packet addressed for HoA1 1122 is part of Flow1, Flow1 Packet addressed for HoA1 1122 may match the traffic selector for FID1. HA1 1106 may forward the packet based on the HoA1/BID1 identification contained in the flow table. HA1 1106 may use the HoA1/BID1 pair to determine that CoA1 is the forwarding address for the packet based on its binding table. HA1 1106 may append the CoA1 address to the header of the received packet Flow1 Packet addressed for HoA1 1022. For example, HA1 1106 may tunnel the received Flow1 packet to WTRU1 1102 at CoA1 by sending Flow1 Packet addressed for CoA1/HoA1 1124 to WTRU1 1102. Upon receiving Flow1 Packet addressed for CoA1/HoA1 1124, WTRU1 1102 may de-tunnel the packet and forward the data contained in Flow1 Packet addressed for CoA1/HoA1 1124 to the appropriate application on WTRU1 1102 for processing.

A user and/or subscriber of WTRU1 1102 may desire to perform an IUT for Flow1. At 1126 WTRU1 1102 may perform Peer Discovery in order to facilitate the IUT. WTRU1 1102 may discover WTRU2 1104, which may be capable of accepting Flow1. At 1128, WTRU1 1102 and WTRU2 1104 may perform transfer preparation and authorization. The IUT request, information exchange, and IUT authorization may be performed in a similar manner as is described above. For example, transfer preparation and authorization may be performed in a manner similar to the manner described with reference to FIGS. 5, 6 and/or 7 above. For example, WTRU1 1102 and WTRU 1104 may exchange application and addressing information.

Upon determining that WTRU2 1104 is capable, ready and/or authorized to receive Flow1, WTRU1 1102 may send MIP Binding Update 1130 to HA1 1102 in order to perform the IUT. In this example, WTRU1 1002 may continue to receive part of Flow1, for example the video portion, and an IUT may be performed for other data in Flow1, for example audio data. Although shown as a single message in FIG. 11, the information in MIP Binding UPDATE 1130 may be included in multiple messages. MIP Binding Update 1130 may include a an updated traffic selector for Flow1 video packets. MIP Binding Update 1130 may include a new traffic selector for Flow1 audio packets and action instructing HA1 1106 to forward the packets associated with Flow1 audio to WTRU2 1104. At 1132, HA1 1106 may update its flow and/or binding table in order to facilitate the IUT based on MIP Binding Update 1130. For example, HA1 1106 may update its binding table by creating an entry for WTRU2 1104 and may update its flow table for HoA1 to update the traffic selector for Flow1 video and create a new entry with the new traffic selector for Flow1 audio. For example, an update binding table is shown in Table 12 and an updated flow table is shown in Table 13.

TABLE 12

| Home Address (HoA) | Binding ID (BID) | Care-of-Address (CoA) |
| --- | --- | --- |
| HoA1 | BID1 | CoA1 |
| HoA2 | BID2 | HoA2 |

TABLE 13

| Flow Identification (FID) | Traffic Selector | Action |
| --- | --- | --- |
| FID1 | Video Filter for Flow1 | Forward to HoA1/BID1 |
| FID2 | Audio Filter for Flow1 | Forward to HoA2/BID2 |

As shown in Table 12, a new entry may be created in the binding table for HA1 1106 for WTRU2 based on MIP Binding Update 1130. In this example, the CoA for WTRU2 1104 may be HoA2, which may be the HoA registered with HA2 1108. As shown in Table 13, a new flow binding entry may be created in the flow binding table for HoA1. In this example, the original traffic selector for Flow1 may be update to match Flow1 video packets. WTRU2 1104 may send MIP Binding Update 1134 to HA2 1108. Based on MIP Binding Update 1134, at 1136 HA2 1008 may update a flow and/or binding table. For example, HA2 1008 may create a flow binding entry for Flow1 audio on HA2 1108. MIP Binding Update 1134 may include an traffic selector for Flow1 audio packets and may also include an action for packets which match the traffic selector. The action may be de-tunnel and forward. For example, HA2 1108 may replace the IP header of packets that match the traffic selector and forward the packets to a specified destination with a new IP header. An example flow binding that may be created on the flow table for HoA2 on HA2 1008 is shown in Table 14.

TABLE 14

| Flow Identification (FID) | Traffic Selector | Action |
| --- | --- | --- |
| FID1 | Audio Filter for Flow1 | De-Tunnel and Forward to HoA2/BID2 |

Continuing with this example, CN 1110 may send Flow1 Video Packet addressed for HoA1 1138. Flow1 Video Packet addressed for HoA1 1138 may be routed to HA1 1106. Upon receiving Flow1 Video Packet addressed for HoA1 1138, HA1 1106 may identify the target address as HoA1. HA1 1106 may compare Flow1 Video Packet addressed for HoA1 1138 to the traffic selectors included in the flow table for HoA1. Flow1 Video Packet addressed for HoA1 1138 may match the traffic selector for FID1. HA1 1106 may perform the action for FID1, which may be to forward the packet to HoA1/BID1. HA1 1106 may determine an appropriate destination address for Flow1 Video Packet addressed for HoA1 1138 based on the HoA1/BID1 pair and the flow binding table for HA1 1106. HA1 1106 may determine that the appropriate destination is CoA1. HA1 1106 may append the CoA1 address to Flow1 Video Packet addressed for HoA1 1138 or tunnel Flow1 Video Packet addressed for HoA1 1138 to CoA1. The tunneled packet may be Flow1 Video Packet addressed for CoA1/HoA1 1140. HA1 1106 may send Flow1 Video Packet addressed for CoA1/HoA1 1140. Flow1 Video Packet addressed for CoA1/HoA1 1140 may be routed to WTRU1 1102. At 1142, WTRU1 1002 may de-tunnel the packet and send the data to the appropriate application.

CN 1110 may send Flow1 Audio Packet addressed for HoA1 1144. Flow1 Audio Packet addressed for HoA1 1144 may be routed to HA1 1106. Upon receiving Flow1 Audio Packet addressed for HoA1 1144, HA1 1106 may identify the target address as HoA1. HA1 1106 may compare Flow1 Audio Packet addressed for HoA1 1144 to the traffic selectors included in the flow table for HoA1. Flow1 Audio Packet addressed for HoA1 1144 may match the traffic selector for FID2. HA1 1106 may perform the action for FID2, which may be to forward the packet to HoA2/BID2. HA1 1106 may determine an appropriate destination address for Flow1 Audio Packet addressed for HoA1 1144 based on the HoA2/BID2 pair and the flow binding table for HA1 1106. HA1 1106 may determine that the appropriate destination is HoA2. HA1 1106 may append the HoA2 address to Flow1 Audio Packet addressed for HoA1 1144 or tunnel Flow1 Audio Packet addressed for HoA1 1144 to HoA2. The tunneled packet may be Flow1 Audio Packet addressed for HoA2/HoA1 1146.

Upon receiving Flow1 Audio Packet addressed for HoA2/HoA1 1146, HA2 1108 may identify the target address as HoA2. HA2 1108 may compare Flow1 Audio Packet addressed for HoA2/HoA1 1146 to the traffic selectors included in the flow table for HoA2. Flow1 Audio Packet addressed for HoA2/HoA1 1146 may match the traffic selector for FID1 in the HoA2 flow table. HA2 1108 may perform the action for FID1, which may be to de-tunnel and forward to HoA2/BID2. HA2 1108 may remove all or part of the IP header from Flow1 Audio Packet addressed for HoA2/HoA1 1146. For example, HA2 1108 may remove the HoA2 address from the IP header. HA2 1108 may determine an appropriate destination address for Flow1 Audio Packet addressed for HoA2/HoA1 1146. Based on the binding table for HA2 1108, HA2 1008 may determine the routing address for Flow1 Audio Packet addressed for HoA2/HoA1 1146 is CoA2. CoA2 may be appended to the de-tunneled Flow1 Audio Packet addressed for HoA2/HoA1 1146 and the packet may be tunneled to WTRU2 1104. The tunneled packet may be Flow1 Audio Packet addressed for CoA2/HoA1 1148. HA2 1108 may send Flow1 Audio Packet addressed for CoA2/HoA1 1148 to WTRU2 1104. At 1150, WTRU2 1104 may de-tunnel Flow1 Audio Packet addressed for CoA2/HoA1 1148 and forward the data to the appropriate application. The IUT of Flow1 Audio data from WTRU1 1102 to WTRU2 1104 may be transparent to CN 1110.

FIG. 12 illustrates an example signaling diagram for an IUT sequence flow using a single tunnel. WTRU1 1202 and WTRU2 1204 may be devices capable of receiving flows. HA1 1206 and HA2 1208 may be HAs that may facilitate an IUT and device mobility. CN 1210 may be a source of a flow. For example, CN 1210 may be a content source, such as a video server. At 1212 WTRU1 1202 may register with HA1 1206. For example, WTRU1 1202 may send a binding update which may include a CoA and/or a BID. For purposes of illustration, WTRU1 1202 may send CoA1 and BID1 to HA1 1206 in order to register with HA1 1206. HA1 1206 may send a binding acknowledgement to WTRU1 1202, which may include a HoA. For instance, HA1 1206 may send HoA1 to WTRU1 1202, which may act as a HoA for WTRU1 1202. At 1214 WTRU2 1204 may register with HA2 1208. For example, WTRU2 1204 may send a binding update which may include a CoA and/or a BID. For purposes of illustration, WTRU2 1204 may send CoA2 and BID2 to HA2 1208 in order to register with HA2 1208. HA2 1208 may send a binding acknowledgement to WTRU2 1204, which may include a HoA. For instance, HA2 1208 may send HoA2 to WTRU2 1204, which may act as a HoA for WTRU2 1204. At 1216 HA1 1006 may create a binding entry for WTRU1 1202. An example binding entry for HA1 1206 is shown in Table 15, below.

TABLE 15

| Home Address (HoA) | Binding ID (BID) | Care-of-Address (CoA) |
|---|---|---|
| HoA1 | BID1 | CoA1 |

At 1218 HA2 1208 may create a binding entry for WTRU2 1204. An example binding entry for HA2 1208 is shown in Table 16, below.

TABLE 16

| Home Address (HoA) | Binding ID (BID) | Care-of-Address (CoA) |
|---|---|---|
| HoA2 | BID2 | CoA2 |

WTRU1 1202 may establish a flow for data from CN 1210. To establish the flow, WTRU1 1202 may send a binding update to HA1 1206 that may include a traffic selector for the flow. For example, the flow from CN 1210 may be referred to as Flow1, and the traffic selector may match all or part of a header of a packet that is associate with Flow1. In another example the traffic selector may be any filter or identifying indicia that provided HA1 1206 a way of identifying packets associate with Flow1. WTRU1 1202 may send an action that HA1 1206 should perform for packets which match the traffic selector. The action may be to forward the packets to HoA1/BID1. At 1220 HA1 1206 may create a flow binding entry in a flow table (or flow binding table) for Flow1. An example flow binding entry is shown in Table 17, below. The flow binding entry may be included in a flow table for HoA1.

TABLE 17

| Flow Identification (FID) | Traffic Selector | Action |
|---|---|---|
| FID1 | Filter for Flow1 | Forward to HoA1/BID1 |

CN 1210 may send Flow1 Packet addressed for HoA1 1222, for example as part of Flow1. Flow1 Packet addressed for HoA1 1222 may be routed to HA1 1206. HA1 1206 may receive Flow1 Packet addressed for HoA1 1222 and compare it to entries in the flow table for HoA1. HA1 1206 may compare Flow1 Packet addressed for HoA1 1222 to the traffic selector for FID1. Since Flow1 Packet addressed for HoA1 1222 is part of Flow1 it may match the traffic selector for FID1. HA1 1206 may forward the packet based on the HoA1/BID1 identification contained in the flow table. HA1 1206 may use the HoA1/BID1 pair to determine that CoA1 is the forwarding address for the packet based on its binding table. HA1 1206 may send Flow1 Packet addressed for CoA1/HoA1 1224 to WTRU1 1202. HA1 1206 may append the CoA1 address to the header of the received packet Flow1 Packet addressed for HoA1 1222. Appending the CoA1 address to the received packet may be referred to as tunneling. For example, HA1 1206 may tunnel the received Flow1 packet to WTRU1 1202 at CoA1. Upon receiving Flow1 Packet addressed for CoA1/HoA1 1224, WTRU1 1202 may de-tunnel the packet and forward the data contained in Flow1 Packet addressed for CoA1/HoA1 1224 to the appropriate application on WTRU1 1202 for processing.

A user and/or subscriber of WTRU1 1202 may desire to perform an IUT for Flow1. At 1226 WTRU1 1202 may perform Peer Discovery in order to facilitate the JUT. WTRU1 1202 may discover WTRU2 1204, which may be capable of accepting Flow1. At 1228, WTRU1 1202 and WTRU2 1204 may perform transfer preparation and authorization. The IUT request, information exchange, and IUT authorization may be performed in a similar manner as is described above. For example, transfer preparation and authorization may be performed in a manner similar to the manner described with reference to FIGS. 5, 6 and/or 7 above. For example, WTRU1 1202 and WTRU 1204 may exchange application and addressing information.

Upon determining that WTRU2 1204 is capable, ready and/or authorized to receive Flow1, WTRU1 1202 may send MIP Binding Update 1230 to HA1 1202 in order to perform the IUT. Although shown as a single message in FIG. 12, the information in MIP Binding Update 1230 may be include in multiple messages. MIP Binding Update 1230 may include a traffic selector for Flow1 and action instructing HA1 1206 to forward the packets associated with Flow1 to WTRU2 1204. Packets not associated with Flow1 but addressed for HoA1 may still be routed to WTRU1 1202 from HA1 1206. At 1232, HA1 1206 may update its flow and/or binding table in order to facilitate the IUT based on MIP Binding Update 1230. For example, HA1 1206 may update its binding table by creating an entry for WTRU2 1204 and may update its flow table for HoA1 to include the newly received traffic selector. For example, an update binding table is shown in Table 18 and an updated flow table is shown in Table 19.

TABLE 18

| Home Address (HoA) | Binding ID (BID) | Care-of-Address (CoA) |
|---|---|---|
| HoA1 | BID1 | CoA1 |
| HoA2 | BID2 | CoA2 |

TABLE 19

| Flow Identification (FID) | Traffic Selector | Action |
|---|---|---|
| FID1 | | Forward to HoA1/BID1 |
| FID2 | Filter for Flow1 | Forward to HoA2/BID2 |

As shown in Table 18, a new entry may be created in the binding table for HA1 1206 for WTRU2 based on MIP Binding Update 1230. In this example, the CoA for WTRU2 1204 may be CoA2, which may be the current IP address for WTRU2 1204, for example. As shown in Table 19, a new flow binding entry may be created in the flow binding table for HoA1. In this example, the original traffic selector for Flow1 may be deleted. This may indicate that all packets associated with Flow1 may be routed based on the FID2 flow binding entry. In another example, the original traffic selector may be modified or the entire FID1 flow binding entry may be deleted.

Continuing with this example, CN 1210 may send Flow1 Packet addressed for HoA1 1234. Flow1 Packet addressed for HoA1 1234 may be routed to HA1 1206. Upon receiving Flow1 Packet addressed for HoA1 1234, HA1 1206 may identify the target address as HoA1. HA1 1206 may compare Flow1 Packet addressed for HoA1 1234 to the traffic selectors included in the flow table for HoA1. Flow1 Packet addressed for HoA1 1234 may match the traffic selector for FID2. HA1 1006 may perform the action for FID2, which may be to forward the packet to HoA2/BID2. HA1 1206 may determine an appropriate destination address for Flow1 Packet addressed for HoA1 1234 based on the HoA2/BID2 pair and the flow binding table for HA1 1206. HA1 1206 may determine that the appropriate destination is CoA2. HA1 1206 may append the CoA2 address to Flow1 Packet addressed for HoA1 1234 or tunnel Flow1 Packet addressed for HoA1 1234 to CoA2. The tunneled packet may be Flow1 Packet addressed for CoA2/HoA1 1236. HA1 1206 may send Flow1 Packet addressed for CoA2/HoA1 1236. Flow1 Packet addressed for CoA2/HoA1 1236 may be routed to WTRU2 1204. At 1238, WTRU2 1204 may de-tunnel Flow1 Packet addressed for CoA2/HoA1 1236 and forward the data to the appropriate application. The IUT of Flow1 from WTRU1 1202 to WTRU2 1204 may be transparent to CN 1210.

Figure 13:
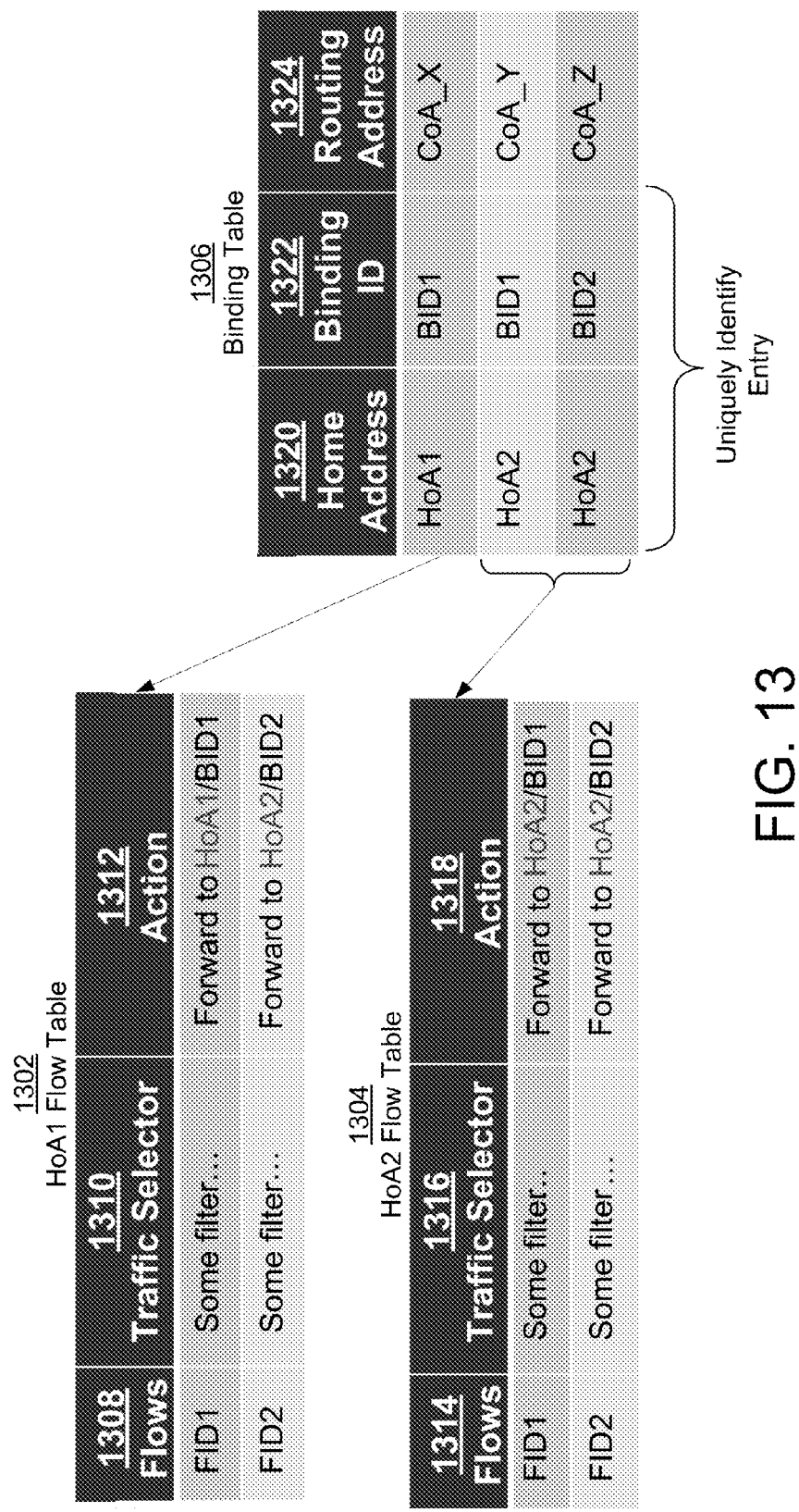
FIG. 13 illustrates example modified flow and binding tables in accordance with an embodiment.

FIG. 13 illustrates example binding and flow tables. For example, the flow and binding tables illustrated in FIG. 13 may be implemented logically at a HA. Binding Table 1306 is an example binding table. Binding Table 1306 may include, but is not limited to, entries such as Home Address 1320, Binding Identification 1322, and/Routing Address 1324. In an example embodiment, entries in Binding Table 1308 may be uniquely identified using a Home Address 1320/Binding ID 1322 pair. In another embodiment, Entries may be uniquely identified by a binding identification 1322, for example if a HoA is associated with a single CoA. A HoA may be associated with flow table. For example HoA1 Flow Table 1302 may be the flow table associated with HoA1. Packets addressed for HoA1 may be compared to entries in HoA1 Flow Table 1302 to determine if the packet matches a traffic selector. HoA1 Flow Table 1302 may include, but is not limited to, entries such as Flow ID 1308, Traffic Selector 1310, and/or Action 1312. Similarly, HoA2 Flow Table 1304 may be the flow table associated with HoA2. Packets addressed for HoA2 may be compared to entries in HoA2 Flow Table 1304 to determine if the packet matches a traffic selector. HoA2 Flow Table 1304 may include, but is not limited to, entries such as Flow ID 1314, Traffic Selector 1316, and/or Action 1318.

For example, as shown in FIG. 13, Binding Table 1306 may be a binding table for two devices using different HoAs. The first device may be associated with HoA1 and may have one interface. As shown in HoA1 Flow Table 1302, part of the traffic addressed for HoA1 may be forwarded to HoA1/BID1 while some of the traffic may be forwarded to HoA2/BID2. Based on the binding entries in Binding Table 1306, it may be determined that traffic forwarded to HoA1/BID1 may be routed to CoA_X, and traffic forwarded to HoA2/BID2 may be routed to CoA_Z. A second device may be associated with HoA2 and may include two interfaces. As shown in HoA2 Flow Table 1304, part of the traffic addressed for HoA2 may be forwarded to HoA2/BID1 while some of the traffic may be forwarded to HoA2/BID2. Based on the binding entries in Binding Table 1306, it may be determined that traffic forwarded to HoA2/BID1 may be routed to CoA_Y, and traffic forwarded to HoA2/BID2 may be routed to CoA_Z.

Figure 14:
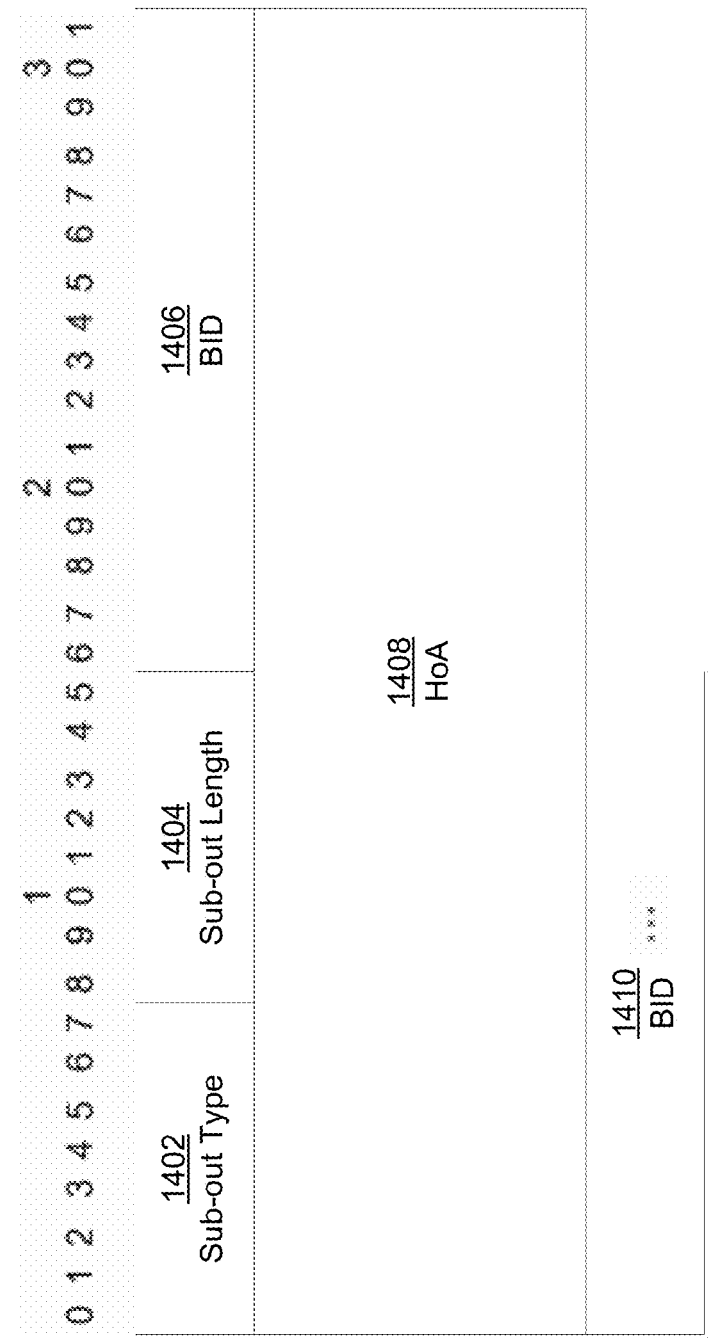
FIG. 14 illustrates an example MIP modified binding reference in accordance with an embodiment.

FIG. 14 illustrates an example modified binding reference sub-option for MIP messages. As an example, the modified binding reference sub-option shown in FIG. 14 may be represented in MIPv6, although other formats may be used. As an example, the binding reference sub-option may be modified to include HoA 1408 which may allow the binding entry specified for redirection in a flow table to be uniquely identified using an HoA/BID pair. In another example, a UEID may be used to uniquely identify a binding entry in the binding table and/or flow table. Sub-opt Type 1402 may specify a sub-option type. Sub-opt Type 1402 may be an 8-bit unsigned integer. Sub-opt Len 1404 may be the length of flow identification sub-option. For example, Sub-opt Len 1404 may be an 8-bit unsigned integer that may specify the sub-option length in octets. BID 1406 and/or BID 1410 may represent binding table entries for an HA.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method comprising:
   registering a first device with a home agent, wherein registering the first device associates a care of address (CoA) for the first device with a home address (HoA), and a first binding identification (BID) in a binding table of the home agent;
   the first device sending a first binding update to the home agent to establish a flow, the first binding update comprising a first traffic selector and a first action, wherein the first action indicates that messages matching the first traffic selector is to be forwarded to an address that is identified by the first HoA and the first BID in the binding table of the home agent; and
   the first device sending a second binding update to the home agent to transfer the flow to a second device, the second binding update comprising a second traffic selector and a second action, wherein the second action indicates that a second message of a plurality of messages is to be forwarded to an address that is identified by a second HoA and a second BID in the binding table at the home agent.

2. The method of claim 1, wherein the second HoA and the second BID are associated with a care-of-address (CoA) for the second device.

3. The method of claim 1, wherein a source of the flow is unaware that the flow has been transferred to the second device.

4. The method of claim 1, further comprising sending a request for authorization to transfer the flow prior to sending the second binding update, and receiving authorization to transfer the flow.

5. The method of claim 1, further comprising discovering the second device and determining if an application being executed on the second device is capable of supporting data included in the flow.

6. The method of claim 5, further comprising sending application information to the second device, the application information facilitating use of data included in the flow.

7. The method of claim 1, wherein addresses included in the binding table of the home agent are further identified based on a user equipment identification (UEID).

8. The method of claim 7, wherein at least two devices associated with a single subscriber share a common HoA.

9. A method comprising:
   a home agent (HA) receiving registration information for a first device from the first device;
   associating a first care of address (CoA) for the first device with a first home address, HoA, and a first a binding identification (BID) in a binding table of the HA, wherein the first CoA is uniquely identifiable in the binding table based on the first HoA and the first BID;
   the home agent receiving a first binding update from the first device, the first binding establishing a flow, the first binding update comprising a first traffic selector and a first action, wherein the first action indicates that messages matching the first traffic selector to be forwarded to an address that is identified by the first HoA and the first BID in the binding table of the HA;
   the home agent routing the messages matching the first traffic selector to the first device at the first CoA;
   the home agent receiving a second binding update from the first device to transfer the flow to a second device, the second binding update comprising a second traffic selector and a second action, wherein the second action indicates that messages matching the second traffic selector and a second BID in the binding table at the home agent be forwarded to an address that is identified by a second HoA; and
   the home agent routing the messages matching the second traffic selector to the second device at a second CoA.

10. The method of claim 9, wherein the second CoA is identified in the binding table by the second HoA and the second BID.

11. The method of claim 9, further comprising receiving a third binding update, wherein the third binding update indicates transferring a first portion of the flow to a third device and a second portion of the flow to a fourth device.

12. The method of claim 9, further comprising determining whether the second binding update is authorized.

13. The method of claim 11, wherein the third binding update comprises a third traffic selector associated with the first portion of the flow and a fourth traffic selector associated with the second portion of the flow.

14. The method of claim 9, further comprising receiving registration information for the second device from the first device.

15. A Wireless Transmit/Receive Unit (WTRU) comprising:
    a processor configured to:
       register the WTRU with a home agent (HA), wherein registering the WTRU associates a care of address, CoA, for the WTRU with a first home address, HoA, and a first a binding identification, BID, in a binding table of the HA;
       send a first binding update to the home agent to establish a flow, the first binding update comprising a first traffic selector and a first action, wherein the first action indicating that a packet is to be forwarded from the home agent to an address that is identified by the first HoA and the first BID in the binding table of the home agent; and
       send a second binding update to the home agent to transfer the flow to a second WTRU, the second binding update comprising a second traffic selector and a second action, wherein the second action indicates that the packet is to be forwarded to an address that is identified by a second HoA and a second BID in the binding table at the home agent.

16. The WTRU of claim 15, wherein addresses included in the binding table of the HA are further identified based on a user equipment identification, UEID.

17. The WTRU of claim 15, wherein the processor is further configured to send a request for authorization to transfer the flow prior to sending the second binding update, and receive authorization to transfer the flow.

18. The WTRU of claim 15, wherein at least two devices associated with a single subscriber share a common HoA.

19. The WTRU of claim 15, wherein the processor is further configured to send a request for authorization to transfer the flow prior to sending the second binding update, and receiving authorization to transfer the flow to the second WTRU.

* * * * *